(12) United States Patent
Kushida

(10) Patent No.: US 7,443,607 B2
(45) Date of Patent: Oct. 28, 2008

(54) ZOOM LENS, AND IMAGE-CAPTURING APPARATUS

(75) Inventor: Taro Kushida, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 57 days.

(21) Appl. No.: 11/625,878

(22) Filed: Jan. 23, 2007

(65) Prior Publication Data

US 2007/0279743 A1 Dec. 6, 2007

(30) Foreign Application Priority Data

May 31, 2006 (JP) .............................. 2006-151986

(51) Int. Cl.
*G02B 15/14* (2006.01)

(52) U.S. Cl. ...................................... 359/687

(58) Field of Classification Search ................ 359/676, 359/678, 686, 687

See application file for complete search history.

(56) References Cited

U.S. PATENT DOCUMENTS 7,274,516 B2 * 9/2007 Kushida et al. ............. 359/687

2005/0275948 A1 * 12/2005 Sueyoshi ...................... 359/676

FOREIGN PATENT DOCUMENTS

| JP | 2005-62228 | 3/2005 |
|---|---|---|
| JP | 2006-71993 | 3/2006 |

* cited by examiner

*Primary Examiner*—Darryl J Collins
(74) *Attorney, Agent, or Firm*—Thomas J. Strouse

(57) ABSTRACT

A sufficiently compact zoom lens equipped with a vibration-control function is provided. The zoom lens includes, in sequence from an object, a first lens group having positive refractive power, a second lens group having negative refractive power, a third lens group having positive refractive power, and a fourth lens group having positive refractive power. The first lens group includes, in sequence from the object, a lens group having positive refractive power and a bending optical system for bending an optical axis to essentially an angle of 90°. Moreover, the third lens group has a stationary lens group having positive refractive power and a movable lens group having positive refractive power. During zooming operation, the second lens group and the fourth lens group are moved along the optical axis. During vibration-control operation, the movable lens group of the third lens group is moved in a direction orthogonal to the optical axis.

14 Claims, 18 Drawing Sheets

ZOOM LENS, AND IMAGE-CAPTURING APPARATUS

CROSS REFERENCE TO RELATED APPLICATIONS

This application claims priority to Japanese Patent Application No. 2006-151986 filed on May 31, 2006, which is incorporated herein by reference in its entirety.

FIELD OF THE INVENTION

The present invention relates to a zoom lens used in a still camera, a video camera, and the like, and more particularly, to an image capturing apparatus equipped with the zoom lens.

BACKGROUND OF THE INVENTION

When a photographer shakes while an image is being captured by use of a camera or the like, shake or so-called camera shake arises in a captured image. Many vibration-control techniques for absorbing camera shake, to thus prevent shaking of a captured image, have hitherto been put forward.

For instance, in a known technique, a camera is provided with detection means for detecting the vibrating state of the camera; and a portion of a plurality of optical members constituting a zoom lens is moved, in response to a signal output from the detection means, in a direction to compensate for blurring of an image attributable to vibrations, thereby making corrections to camera shake and attempting to render an image stable.

Japanese Patent Laid-Open Publication No. 2005-62228 describes a zoom lens specialized in such a vibration-control technique. The zoom lens described in the patent publication includes four lens groups having, in sequence from an object, positive refractive power, negative refractive power, positive refractive power, and positive refractive power. In this zoom lens, the third lens group includes a lens group 3a and a lens group 3b having positive refractive power. The lens group 3b is moved so as to acquire a component of a direction perpendicular to the optical axis, to thus absorb camera shake. Such a zoom lens prevents occurrence of camera shake.

Moreover, in order to miniaturize a zoom lens, use of a bending optical system which bends an optical axis to an angle of about 90° has also been proposed. For instance, Japanese Patent Laid-Open Publication No. 2006-71993 describes a zoom lens including five lens groups having, in sequence from an object, positive refractive power, negative refractive power, positive refractive power, positive refractive power, and negative refractive power. In this zoom lens, a first lens group has a reflection member for bending the optical axis to an angle of about 90°. A portion of optical members constituting a fifth lens group is moved in a direction orthogonal to the optical axis, thereby absorbing camera shake. In such a zoom lens, the optical axis is bent to an angle of about 90° by means of a reflection member, and hence the longitudinal width of the zoom lens can be reduced.

However, in the zoom lens described in the former patent publication, the four lens groups are arranged in a straight line, and hence the entire zoom lens is likely to become bulky, which in turn makes the entire camera bulky.

In the latter patent publication, the zoom lens can be made compact to a certain extent by provision of a reflection member. However, the reflection member is arranged immediately behind the lens group having negative refractive power. In this case, a reflection surface of the reflection member must be made comparatively larger. Moreover, a lens on an image-surface-side, or the like, must also be made larger. Consequently, difficulty is encountered in sufficiently miniaturizing the zoom lens and an image capturing apparatus equipped with the zoom lens.

Put another way, in the prior art, difficulty is encountered in realizing a zoom lens having a sufficiently compact vibration-control function and an image capturing apparatus equipped with the zoom lens.

SUMMARY OF THE INVENTION

Accordingly, the present invention provides a sufficiently compact zoom lens having a vibration-control function, and a camera equipped with the zoom lens.

The present invention provides a zoom lens including, in sequence from an object, a first lens group having positive refractive power, a second lens group having negative refractive power, a third lens group having positive refractive power, and a fourth lens group having positive refractive power, wherein the first lens group includes, in sequence from the object, a lens group having positive refractive power and a bending optical system for bending an optical axis to essentially an angle of 90°;

the third lens group has a stationary lens group having positive refractive power and a movable lens group having positive refractive power;

the second lens group and the fourth lens group are moved along the optical axis during zooming operation; and the movable lens group of the third lens group is moved in a direction orthogonal to the optical axis during vibration-control operation.

In a preferred mode, provided that the focal length of the overall third lens group is taken as f3; that the focal length of the stationary lens group is taken as fa; and that an air spacing interval between a surface of the stationary lens group closest to the movable lens group and a surface of the movable lens group closest to the stationary lens group is taken as Dab, $1.4 < fa/f3 < 3.1$ and $0.01 < Dab/f3 < 0.10$ are satisfied.

In another preferred mode, the movable lens group is formed from a single positive single lens. In another preferred mode, the movable lens group is formed from only a cemented lens into which a positive lens having positive refractive power and a negative lens having negative power are cemented together, in sequence from the object. In this case, provided that an Abbe number of a positive lens forming the cemented lens of the movable lens group is taken as vb1 and that an Abbe number of a negative lens forming the same is taken as vb2, $|vb1-vb2| > 20$ is satisfied.

In yet another preferred mode, the stationary lens group includes a cemented lens into which a positive lens having positive refractive power and a negative lens having negative power are cemented together, in sequence from the object. The stationary lens group is preferably formed from only a cemented lens into which a positive lens having positive refractive power and a negative lens having negative power are cemented together, in sequence from the object. Moreover, the stationary lens group preferably includes a cemented lens into which a positive lens having positive refractive power, a positive lens having positive refractive power, and a negative lens having negative power are cemented together, in sequence from the object. In these cases, provided that an Abbe number of a positive lens forming the cemented lens of the stationary lens group is taken as va1 and that an Abbe number of a negative lens forming the same is taken as va2, $|va1-va2| > 5$ is desirably satisfied.

In still another preferred mode, the stationary lens group preferably has a lens surface of aspherical shape whose action of converging a luminous flux becomes weaker with increasing distance from the optical axis to a periphery of the lens surface. In yet another preferred mode, provided that the maximum height of an image on an image surface is taken as "d" and that a focal length of an entire lens system achieved at a wide-angle end thereof is taken as fw, d/fw<0.22 is satisfied.

In another preferred mode, the third lens group preferably includes the stationary lens group and the movable lens group arranged in this sequence from the object. In still another preferred mode, the third lens group preferably includes the movable lens group and the stationary lens group arranged in this sequence from the object.

The present invention also provides an image capturing apparatus having any one of the above-described zoom lenses.

According to the present invention, a vibration-control function is acquired by means of moving the movable lens group of the third lens group in a direction orthogonal to the optical axis. Since the first lens group is provided with a bending optical system, the longitudinal width of the overall zoom lens can be shortened. Further, since a positive lens group having positive refractive power is provided at a position closer to the object in relation to the bending optical system, the overall zoom lens can be miniaturized. Specifically, the present invention enables provision of a sufficiently compact zoom lens with a vibration-control function, as well as provision of a camera equipped with the zoom lens.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Figure 1:
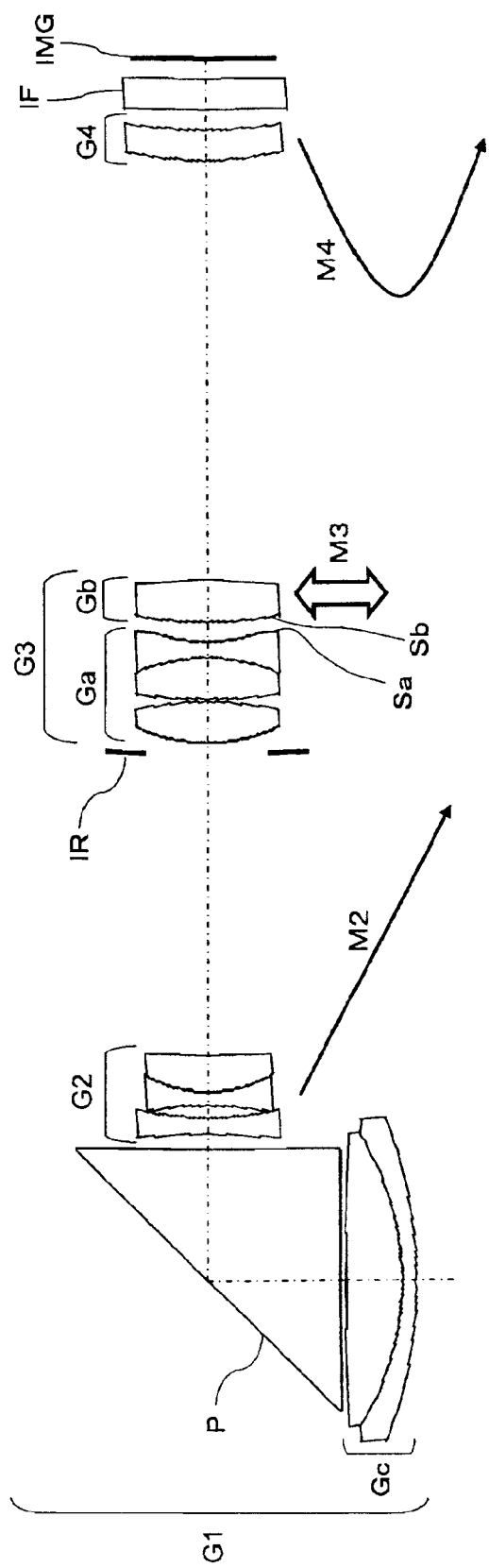
FIG. 1 is a view showing the configuration of a zoom lens which is a basic embodiment of the present invention.

Embodiments of the present invention will be described hereunder by reference to the drawings. FIG. 1 is a view showing the configuration of a zoom lens which is a fundamental embodiment of the present invention. This zoom lens has, in sequence from an object, a first lens group G1 having positive refractive power, a second lens group G2 having negative refractive power, a third lens group G3 having positive refractive power, and a fourth lens group G4 having positive refractive power. An iris member IR for limiting the amount of incident light is interposed between the second lens group G2 and the third lens group G3. An optically-equivalent member IF interposed between the fourth lens group G4 and an image-forming surface IMG is an optical member group includeing IR reflection glass provided with IR-screen coating for reflecting an infrared-radiation which adversely affects color reproduction; a low-pass filter for hindering occurrence of spurious resolution; and a cover glass of an image capturing element.

An incident luminous flux having entered the zoom lens from the object side thereof is converged by the first lens group G1 having positive refractive power and magnified by means of the second lens group G2 having negative refractive power. Subsequently, the thus-magnified incident luminous flux is converged by the third lens group G3 having positive refractive power and the fourth lens group G4 having positive refractive power, to thus form an image on the image-forming surface IMG. During scaling operation, the second lens group G2 moves linearly along the optical axis, and the fourth lens group G4 moves non-linearly along the optical axis so as to correct the movement of a focal position associated with movement of the second lens group G2. Lens paths M2 and M4 shown in FIG. 1 show paths along which the second and fourth lens groups G2 and G4 travel during scaling operation from a wide-angle side to a telephotograph side. Specifically, during scaling operation from the wide-angle side to the telephotograph side, the second lens group moves linearly from the object side toward the image-forming surface IFM along the optical axis. The fourth lens group moves along a non-linear path having such a fold that the path becomes convex toward the object side along the optical axis. During scaling operation from the telephoto side to the wide-angle side, a path of movement reverse to this path is rendered.

In the present embodiment, in order to shorten the longitudinal width (i.e., a width vertical with respect to the surface of paper) of the entire zoom lens, a bending member P for bending the optical axis to an angle of about 90° is provided in the first lens group G1. In the present embodiment, the first lens group G1 has, in sequence from the object, a positive lens group Gc having positive refractive power, and the bending member P which is disposed behind the positive lens group Gc (i.e., at a position closer to the image-forming surface in relation to the positive lens group Gc) and which bends the optical axis to an angle of about 90°. The optical axis is bent to an angle of about 90° by means of the bending member P, thereby shortening the longitudinal width of the entire zoom lens and, by extension, the longitudinal width of an image capturing apparatus equipped with the zoom lens.

In a related-art zoom lens equipped with the bending member P that bends an optical path, a negative lens having negative refractive power is commonly disposed at a position closer to the object in relation to the bending member P. At the wide-angle side, a luminous flux originating from a wide-angle range can be caused to enter the lens by means of such a configuration. However, as a result of the negative lens being arranged at a position closer to the object side in relation to the bending member P, the incident luminous flux diverges to a size greater than the diameter D of an entrance pupil. Accordingly, the bending member P or the lens group disposed at a position closer to the image-forming surface in relation to the bending member P must be made larger. Especially, in order to ensure a comparatively-bright aperture f-number at the telephoto side where a long focal length is achieved, the diameter D of the entrance pupil must be set to a certain size. Therefore, in a configuration where a negative lens is disposed at a position closer to the object in relation to the bending member P, there has been no alternative but to increase the size of the bending member or a lens group to be disposed at a position closer to the image-forming side in relation to the bending member. In this case, an increase in the size and weight of the zoom lens is incurred, and there may also arise various problems, such as an increase in power consumed by actuation of a lens of an increased weight.

Therefore, in the present embodiment, the positive lens group Gc is arranged at a position closer to the object in relation to the bending member P. As a result, the length of the optical axis (i.e., the longitudinal width of the zoom lens) at the object side in relation to the bending member P can be shortened while a comparatively-bright aperture f-number is ensured even for a long focal length at the telephoto side.

The third lens group is broadly divided into a stationary lens group Ga having positive refractive power and a movable lens group Gb having positive refractive power. In order to absorb fluctuations in the position of an image stemming from a camera shake or the like, the movable lens group Gb is moved in the same direction in which the camera shake arises, thereby preventing fluctuations in an image reaching the image-forming surface IMG. Specifically, as indicated by arrow M3 in FIG. 1, the movable lens group Gb is a lens group which is moved in a direction orthogonal to the optical axis. Meanwhile, the stationary lens group Ga is a lens group which is not moved and remains stationary along the optical axis even during vibration-control operation. FIG. 1 shows an example where the stationary lens group Ga and the movable lens group Gb are arranged in this sequence from the object. However, the sequence of arrangement of the stationary lens group Ga and the movable lens group Gb can be changed as necessary. Naturally, the movable lens group Gb may be arranged at the object side, and the stationary lens group Ga arranged at the image-forming surface side.

The lens groups used for controlling vibrations are desired to generate little aberration during vibration-control operation and to travel little during vibration-control operation, from the viewpoint of the structure of the mechanism and power consumption. Accordingly, in the present embodiment, a portion of the third lens group G3 close to the iris member IR is used for controlling vibrations. The third lens group G3 is a lens group which converges an image of a subject magnified by means of negative refractive power of the second lens group G2 in cooperation with the fourth lens group G4, to thus form an image and has comparatively-large refractive power. Displacing a portion of the third lens group G3 having such large refractive power (i.e., the movable lens group Gb) from the optical axis to control vibrations is likely to entail an increase in aberration. In order to prevent occurrence of such a problem, the third lens group G3 is desired to be configured so as to satisfy conditions indicated by Equations 1 and 2 provided below.

$$1.4 < fa/f3 < 3.1 \quad \text{Eq. 1}$$

$$0.01 < Dab/f3 < 0.10 \quad \text{Eq. 2}$$

Reference symbol fa designates a focal length of the stationary lens group Ga; and f3 designates a focal length of the entire third lens group G3. Further, reference symbol Dab designates axial surface separation between a surface Sa of the stationary lens group Ga, the surface being closest to the movable lens Gb, and a surface Sb of the movable lens group Gb, the surface being closest to the stationary lens group Ga. As a result of the third lens group G3 being configured so as to satisfy the conditions indicated by Equations 1 and 2, axial coma aberrations, chromatic aberrations, and other aberrations, which arise during vibration-control operation, can be corrected well.

The movable lens group Gb is desired to have solely undergone appropriate chromatic aberrations. Moreover, in order to miniaturize and reduce power consumption of a vibration-control mechanism, the movable lens group Gb is desired to be formed from the minimum number of lenses; in other words, to the greatest reduction in weight. To this end, the movable lens group Gb is desired to be formed from a positive single lens or one cemented lens. When the movable lens group Gb is formed from a cemented lens, the cemented lens is desired to be formed by cementing together, in sequence from an object, a positive lens and a negative lens. In this case, when the Abbe number of the positive lens constituting the cemented lens is taken as vb1 and the Abbe number of the negative lens constituting the same is taken as vb2, conditions represented by Equation 3 provided below are described to be fulfilled.

$$|vb1 - vb2| > 20 \quad \text{Eq. 3}$$

Meanwhile, during vibration-control operation, the stationary lens group Ga remaining stationary on the optical axis is desired to include a cemented lens including, in sequence from the object, a positive lens and a negative lens. This is intended for miniaturizing the zoom lens while making an appropriate correction on axial aberrations, which would otherwise raise a problem in the telephotograph zoom lens system. In order to make an appropriate correction on chromatic aberrations, a cemented lens of the stationary lens group Ga preferably satisfies conditions represented by Equation 4 provided below.

$$|va1 - va2| > 5 \quad \text{Eq. 4}$$

In this equation, va1 designates the Abbe number of a positive lens constituting the cemented lens, and va2 designates the Abbe number of a negative lens constituting the cemented lens.

Moreover, the stationary lens group Ga may also be formed from a cemented lens satisfying the conditions represented by Eq. 4. In this case, the number of lenses is reduced, and a more compact, inexpensive zoom lens can be implemented.

In another desired embodiment, the stationary lens group Ga may also be provided with an aspherical lens surface whose action for converging a luminous flux becomes weaker with increasing distance from the optical axis to the periphery of the lens. As a result of the stationary lens group Ga being provided with such an aspherical lens surface, appropriate corrections can be made to spherical aberrations, coma aberrations, and the like, even when the movable lens group Gb has been moved for vibration-control operation.

Moreover, the maximum half angle-of-view $\omega$ of the zoom lens which becomes effective during achievement of infinite focus desirably varies within a range of about 12.5° or less. In general, provided that the effective image circle (the maximum height of an image surface) of an image surface is "d" and that a focal length is "f," a relationship represented by the following equation is known to exist between the half angle-of-view $\omega$, the effective image circle "d," and the focal length "f."

$$d = f \times \tan(\omega)$$

When the focal length achieved at a wide-angle end of the overall lens system constituting the zoom lens is taken as fw, the zoom lens of the present embodiment can be said to fulfill conditions represented by Equation 7 provided below.

$$d/fw < \tan(12.5°)$$

$$\tan(12.5°) \approx 0.22$$

$$d/fw < 0.22 \quad \text{Eq. 5}$$

As is evident from the above descriptions, according to the present embodiment, a portion of the third lens group G3 is moved in a direction orthogonal to the optical axis, to thus control vibrations. Therefore, a zoom lens having a vibration-control function can be realized while a superior optical characteristic is maintained. Moreover, as a result of provision of a bending member for bending an optical axis to an angle of about 90° and a positive lens group which is disposed closer to the object in relation to the bending member and has positive refractive power, a compact zoom lens having a superior optical characteristic can be realized while a comparatively-bright aperture F-number is maintained.

Figure 42:
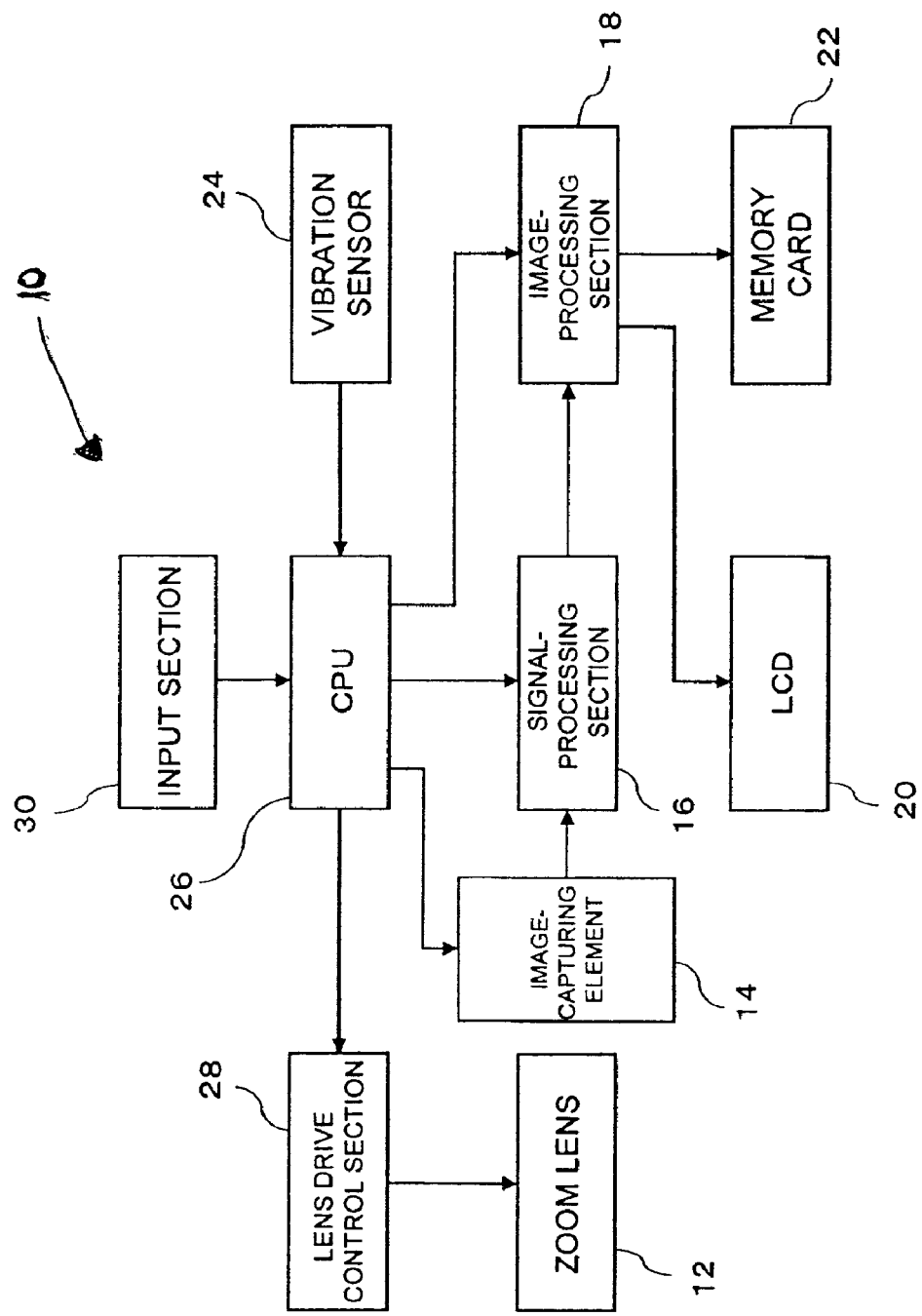
FIG. 42 is a view showing the general configuration of an image capturing apparatus equipped with a zoom lens.

The configuration of an image capturing apparatus equipped with this zoom lens will now be briefly described. FIG. 42 is a view showing the schematic configuration of the digital camera 10 equipped with this zoom lens.

This digital camera 10 includes the previously described zoom lens 12 formed from four lens groups; and an image capturing element 14 for converting an image of a subject guided by the zoom lens 12 into an electrical signal. The image capturing element 14 outputs, as an image signal, the image of the subject converted into an electrical signal to a signal-processing section 16.

The signal-processing section 16 subjects the input signal to predetermined signal processing; for example, processing operations such as A/D conversion, noise rejection, pixel addition, or the like; and outputs a processed signal as image data to an image-processing section 18. The image-processing section 18 subjects, as needed, input image data to various image-processing operations; e.g., $\gamma$ correction processing, white balance processing, JPEG compression processing, and the like. Image data having undergone image processing are displayed on an LCD 20, as well as being stored in a memory card 22 in accordance with a user's instruction.

A vibration sensor 24 detects the amount of vibration in the entire camera attributable to camera shake or the like. A result of detection is output to a control section 26. In accordance with the result of detection performed by the vibration sensor 24, the control section 26 determines whether or not vibrating operation exists and computes the amount of drive of the third lens group performed during vibration-control operation, or the like. Various computed parameters pertaining to vibration-control operation are output to a lens drive control section 28. When image-forming operation, scaling operation, and vibration-control operation are required, the lens drive control section 28 outputs a drive signal to a lens movement mechanism mounted on the zoom lens, thereby instructing movement of the lens group.

At this time, according to the zoom lens of the present embodiment, various aberrations can be corrected well at any time, including at the time of vibration control. Hence, an appropriately formed image of the subject can be acquired.

Next, specific embodiments of the zoom lens will be described.

First Embodiment

Figure 2:
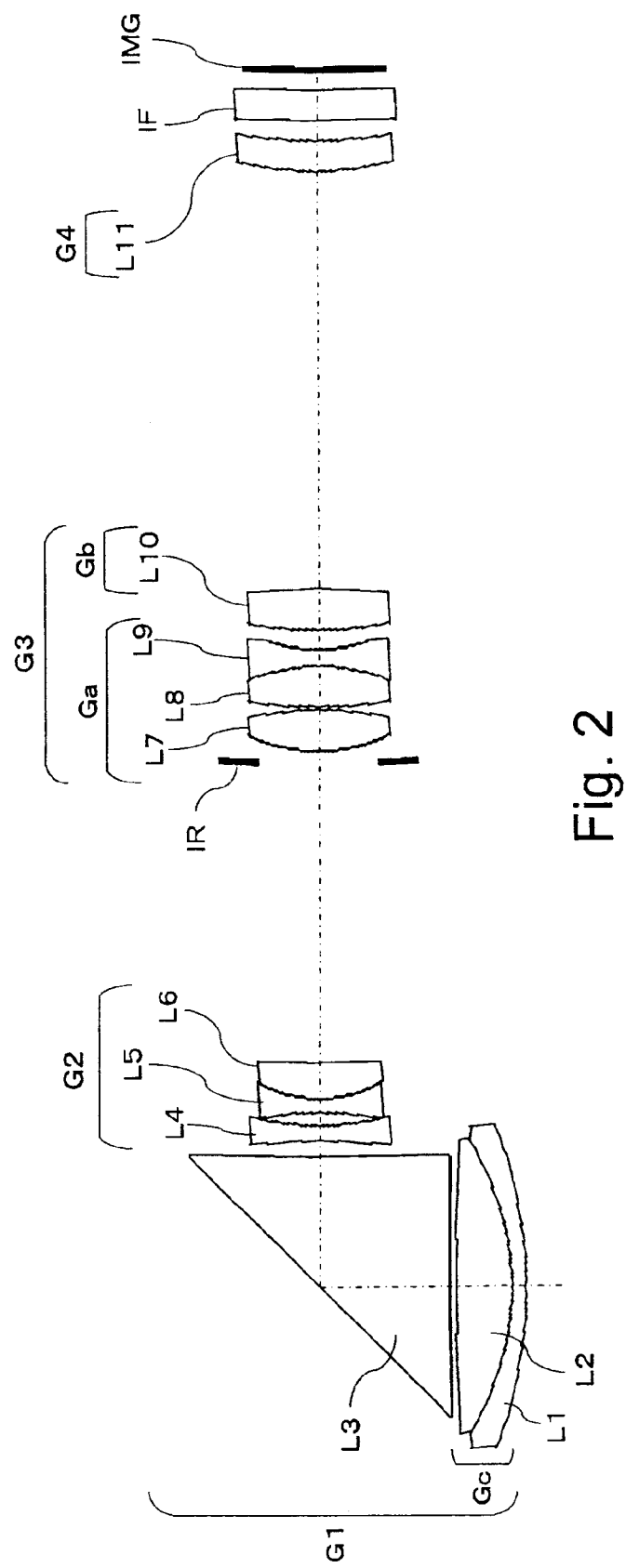
FIG. 2 is a view showing the configuration of the zoom lens of the first embodiment.

FIG. 2 is a view showing the configuration of a zoom lens of a first embodiment. This zoom lens has, in sequence from an object, a first lens group G1 having positive refractive power; a second lens group G2 having negative refractive power; a third lens group G3 having positive refractive power; and a fourth lens group G4 having positive refractive power. The iris member IR for controlling the amount of incident light is interposed between the second lens group G2 and the third lens group G3. Moreover, the optically-equivalent member IF formed from infrared-radiation reflection glass, a low-pass filter, protective glass, or the like, is further interposed between the fourth lens group G4 and the image-forming plant IMG.

The first lens group G1 includes, in sequence from the object, a positive lens group Gc having positive refractive power, and a bending member L3 for bending the optical axis to an angle of about 90°. The positive lens group Gc is a cemented lens into which a negative meniscus lens L1 and a biconvex lens L2 are cemented in this sequence from the object. The bending member L3 is a triangular prism.

The second lens group G2 is formed from a cemented lens into which a biconcave lens L4, a biconcave lens L5, and a positive meniscus lens L6 whose convex surface is oriented toward the object are, in this sequence from the object, cemented together. The second lens group G2 has, on the whole, negative refractive power. During scaling operation, the second lens group G2 linearly moves along the optical axis.

The third lens group G3 includes, in sequence from the object, a stationary lens group Ga having positive refractive power and a movable lens group Gb having positive refractive power. The stationary lens group Ga is formed from a cemented lens into which a biconvex lens L7, a biconvex lens L8, and a biconcave lens L9, in sequence from the object, are cemented. The movable lens group Gb is formed from a single biconvex lens L10. This movable lens group Gb is moved in a direction orthogonal to the optical axis, to thus perform a vibration-control function of correcting a positional displacement of an image attributable to camera shake, or the like.

The fourth lens group G4 is formed from a positive meniscus lens L11 whose convex surface is oriented toward the object side; and has, on the whole, positive refractive power. During scaling function, the fourth lens group is linearly moved along the optical axis, thereby correcting fluctuations in the focal length derived from movement of the second lens group.

Table 1 shows specific numerical values of the focal length "f," the aperture F-number Fno, and the half angle of view ω of the zoom lens of the first embodiment. Table 2 shows numerical values of respective lenses constituting the zoom lens of the second embodiment.

TABLE 1

|  | f | Fno | ω |
|---|---|---|---|
| Wide-angle end | 22.00 | 5.01 | 9.43 |
| Middle point | 38.30 | 4.93 | 5.38 |
| Telephoto end | 66.70 | 5.01 | 3.06 |

TABLE 2

| Lens No. | Surface No. | Curvature Radius R | Surface Separation Distance D | Refractive Index Nd | Abbe No. νd |
|---|---|---|---|---|---|
| L1 | S1 | 21.818 | D1  0.750 | 1.8061 | 33.3 |
| L2 | S2 | 13.764 | D2  2.800 | 1.5638 | 60.8 |
|  | S3 | −131.820 | D3  0.300 |  |  |
| L3 | S4 | INF | D4  13.000 | 1.8467 | 23.8 |
|  | S5 | INF | D5  VARIABLE |  |  |
| L4 | S6 | −40.790 | D6  0.800 | 1.4970 | 81.6 |
|  | S7 | 12.803 | D7  0.600 |  |  |
| L5 | S8 | −20.981 | D8  0.700 | 1.7880 | 47.5 |
| L6 | S9 | 6.163 | D9  1.800 | 1.8061 | 33.3 |
|  | S10 | 3273.000 | D10  VARIABLE |  |  |
| IR | — | — | DIR  0.500 |  |  |
| L7 | S11 | 7.667 | D11  2.000 | 1.5831 | 59.5 |
| L8 | S12 | −23.100 | D12  0.200 | 1.5168 | 64.2 |
|  | S13 | 26.054 | D13  2.000 |  |  |
| L9 | S14 | −9.584 | D14  0.800 | 1.6541 | 39.6 |
|  | S15 | 6.820 | D15  1.000 |  |  |
| L10 | S16 | 18.259 | D16  2.000 | 1.4970 | 81.6 |
|  | S17 | −85.560 | D17  VARIABLE |  |  |
| L11 | S18 | 15.173 | D18  1.500 | 1.4875 | 70.4 |
|  | S19 | 20.485 | D19  VARIABLE |  |  |
| IF | S20 | INF | D20  1.500 | 1.5168 | 64.2 |
|  | S21 | INF | D21  — |  |  |

In the present embodiment, in order to enable superior correction of spherical aberration, coma aberration, and the like, a surface S11 of the stationary lens group that is closest to the object is formed into such an aspherical shape that the action of converging a luminous flux becomes weaker with increasing distance from the optical axis to the periphery of the lens. This aspherical shape is expressed by Equation 6 provided below, provided that a distance from a vertex of each aspherical surface in the optical axis is taken as "x"; that a distance from the vertex in a direction orthogonal to the optical axis is taken as "y"; that a paraxial curvature radius is taken as R; and that an aspherical coefficient is taken as "k," A, B, C, and D. Table 3 provides specific numerical values of the aspherical coefficients "k," A, B, C, and D of surface S11.

$$x = \frac{(1/R)y^2}{1 + \sqrt{1-(1+k)(y/R)^2}} + Ay^4 + By^6 + Cy^8 + Dy^{10} \qquad \text{Eq. 6}$$

TABLE 3

| Surface No. | K | A | B | C | D |
|---|---|---|---|---|---|
| S11 | 0.00000E+00 | −8.8346E−01 | 0.0000E+00 | 0.0000E+00 | 0.0000E+00 |

Moreover, Table 4 shows values acquired at a wide-angle end, an intermediate focal length, and a telephoto end of each of surface separation distances D5, D10, D17, and D19, which are changed by scaling operation.

TABLE 4

|  | Focal Length | | |
|---|---|---|---|
|  | 22.00 | 38.30 | 66.70 |
| D5 | 0.700 | 8.085 | 14.062 |
| D10 | 14.862 | 7.477 | 1.500 |
| D17 | 20.504 | 6.83 | 20.504 |
| D19 | 1.000 | 14.674 | 1.000 |

Table 5 shows specific numerical values of parameters of the first embodiment represented by Conditional Equations 1 through 5.

TABLE 5

| Eq. 1 | $1.4 < fa/f3 < 3.1$ | 1.5 |
|---|---|---|
| Eq. 2 | $0.01 < Dab/f3 < 0.10$ | 0.06 |
| Eq. 3 | $|vb1 - vb2| > 20$ | — |
| Eq. 4 | $|va1 - va2| > 5$ | 24.6 |
| Eq. 5 | $d/fw < 0.22$ | 0.16 |

As is evident from Table 5, in the present embodiment, Conditional Equations 1, 2, 4, and 5 are understood to be satisfied. In the first embodiment, since the movable lens group Gb is a single lens, specific numerical values of Conditional Equation 3 are naturally not computed.

Figure 3:
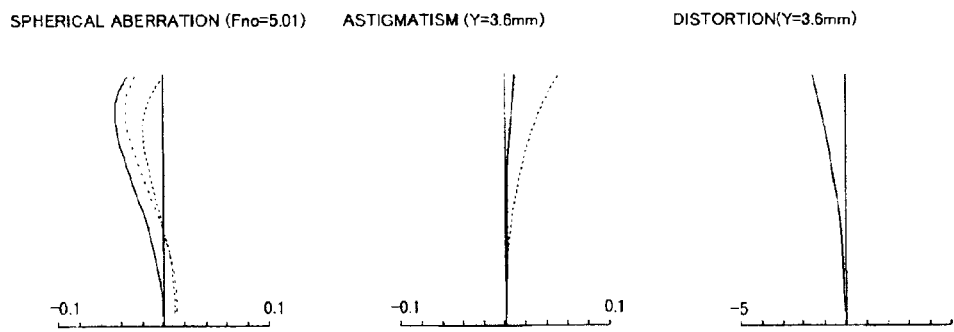
FIG. 3 is a view of various aberrations acquired at a wide-angle end of the zoom lens of the first embodiment.
Figure 4:
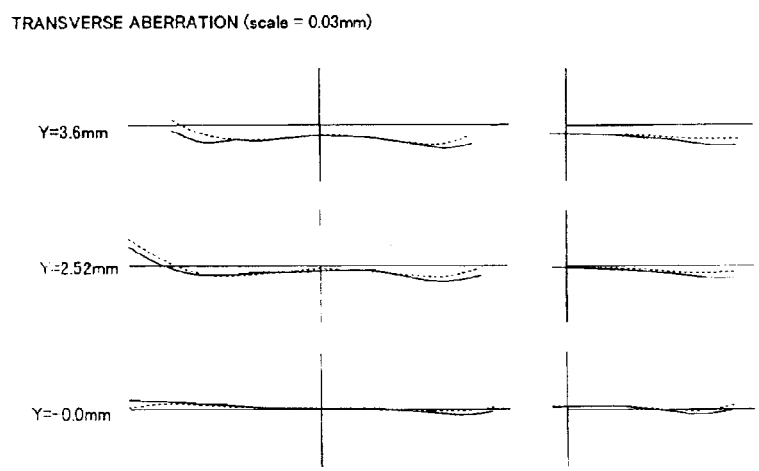
FIG. 4 is a view of transverse aberration acquired at the wide-angle end of the zoom lens of the first embodiment.
Figure 5:
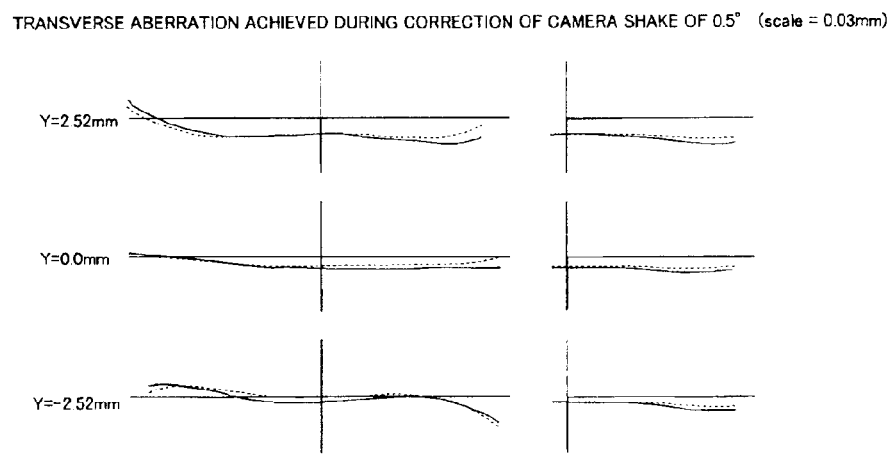
FIG. 5 is a view of transverse aberration acquired during correction of camera shake at the wide-angle end of the zoom lens of the first embodiment.

Next, optical characteristics of the zoom lens of the first embodiment will be described. FIGS. 3 through 5 are various diagrams of aberration achieved at the wide-angle end of the zoom lens of the first embodiment. FIG. 3 shows, in sequence from the left, a spherical aberration diagram, an astigmatism diagram, and a distortion aberration diagram. In the spherical aberration diagram, a solid line shows spherical aberration acquired in d-line; a broken line shows spherical aberration acquired in F-line; and a dashed line shows spherical aberration acquired in C-line. Moreover, in the astigmatism view, a solid line designates values acquired on a saggital surface, and a broken line designates values acquired on a tangential image surface. FIG. 4 is a view of transverse aberration, and FIG. 5 is a view of transverse aberration acquired when camera shake of 0.5° is corrected. In FIGS. 4 and 5, a solid line designates values acquired along the d-line and a broken line designates values acquired along the F-line. In FIGS. 3 through 5, Y designates the height of an image.

Figure 6:
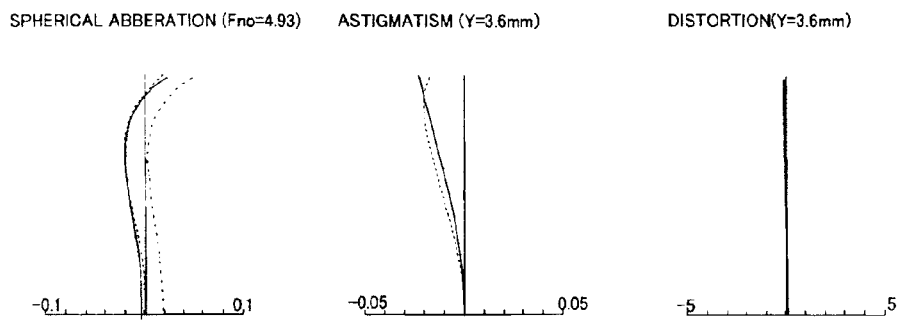
FIG. 6 is a view of various aberrations acquired at an intermediate focal length of the zoom lens of the first embodiment.
Figure 7:
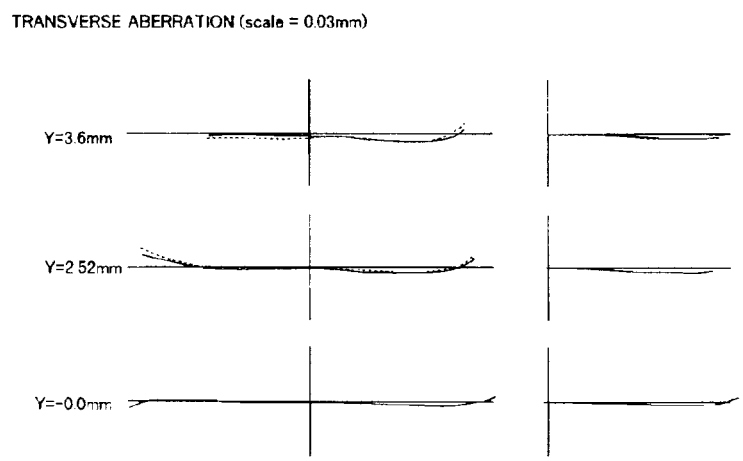
FIG. 7 is a view of transverse aberration acquired at the intermediate focal length of the zoom lens of the first embodiment.
Figure 8:
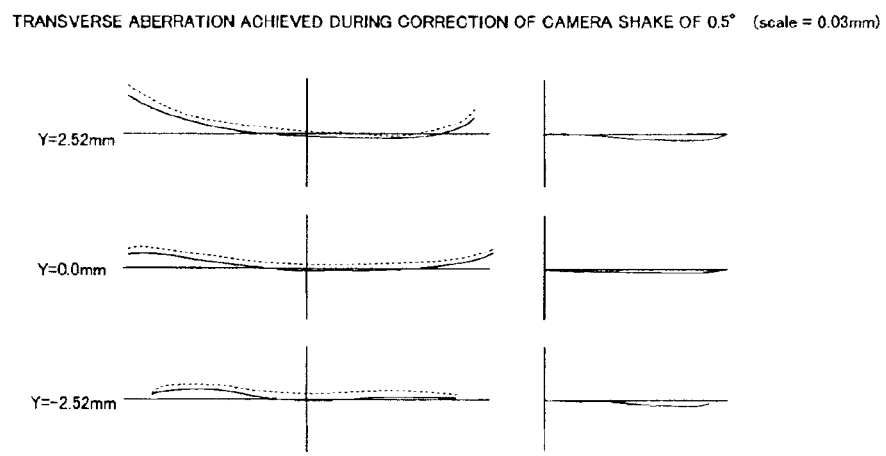
FIG. 8 is a view of transverse aberration acquired during correction of camera shake at the intermediate focal length of the zoom lens of the first embodiment.
Figure 9:
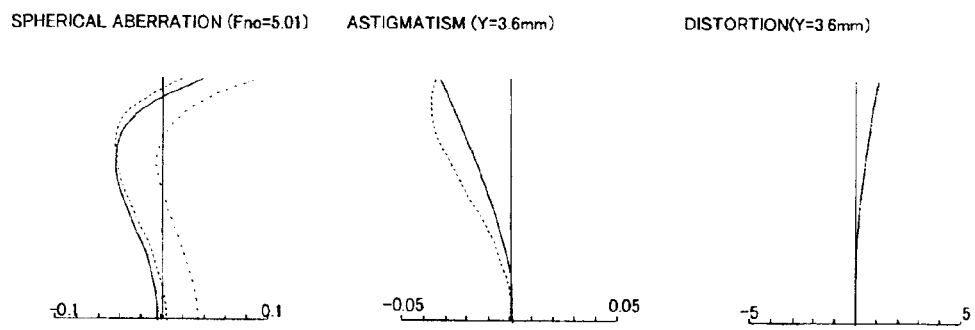
FIG. 9 is a view of various aberrations acquired at a telephoto end of the zoom lens of the first embodiment.
Figure 10:
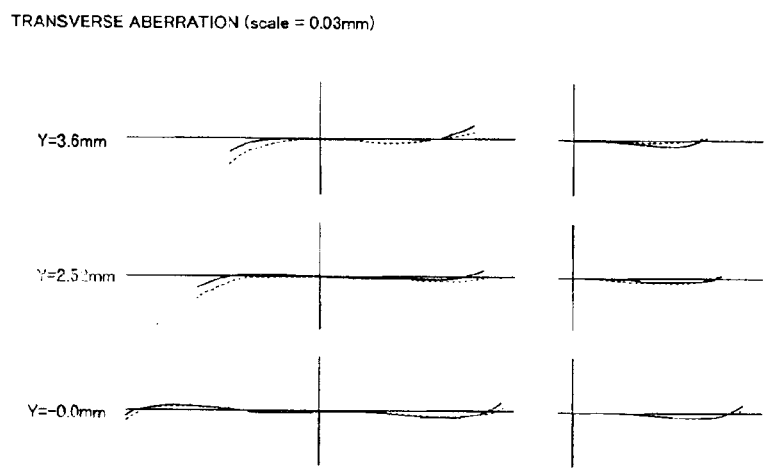
FIG. 10 is a view of transverse aberration acquired at the telephoto end of the zoom lens of the first embodiment.
Figure 11:
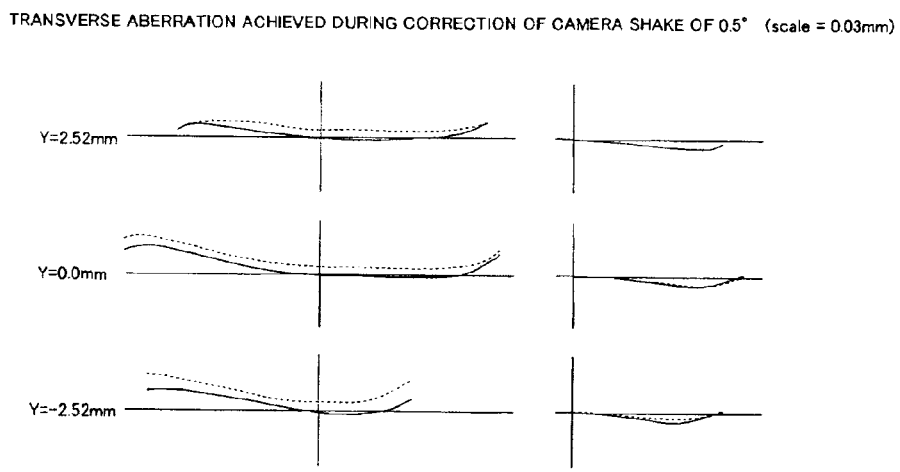
FIG. 11 is a view of transverse aberration acquired during correction of camera shake at the telephoto end of the zoom lens of the first embodiment.

FIGS. 6 through 8 are diagrams of aberration achieved at the intermediate focal length of the zoom lens of the first embodiment. FIGS. 6 through 8 show the same characteristics as those shown in FIGS. 3 through 5. Specifically, FIG. 6 shows, in sequence from the left, a spherical aberration diagram, an astigmatism diagram, and a distortion aberration diagram. FIG. 7 is a view of transverse aberration, and FIG. 8 is a view of transverse aberration acquired when camera shake of 0.5° is corrected. FIGS. 9 through 11 are diagrams of various aberrations achieved at a telephoto end of the zoom lens of the first embodiment. FIGS. 9 through 11 show the same characteristics as those shown in FIGS. 3 to 5 and FIGS. 6 to 8.

As is obvious from FIGS. 3 through 11, according to the first embodiment, aberrations are understood to be well corrected at all times, including the time of vibration-control operation, and have superior optical characteristics.

Second Embodiment

Figure 12:
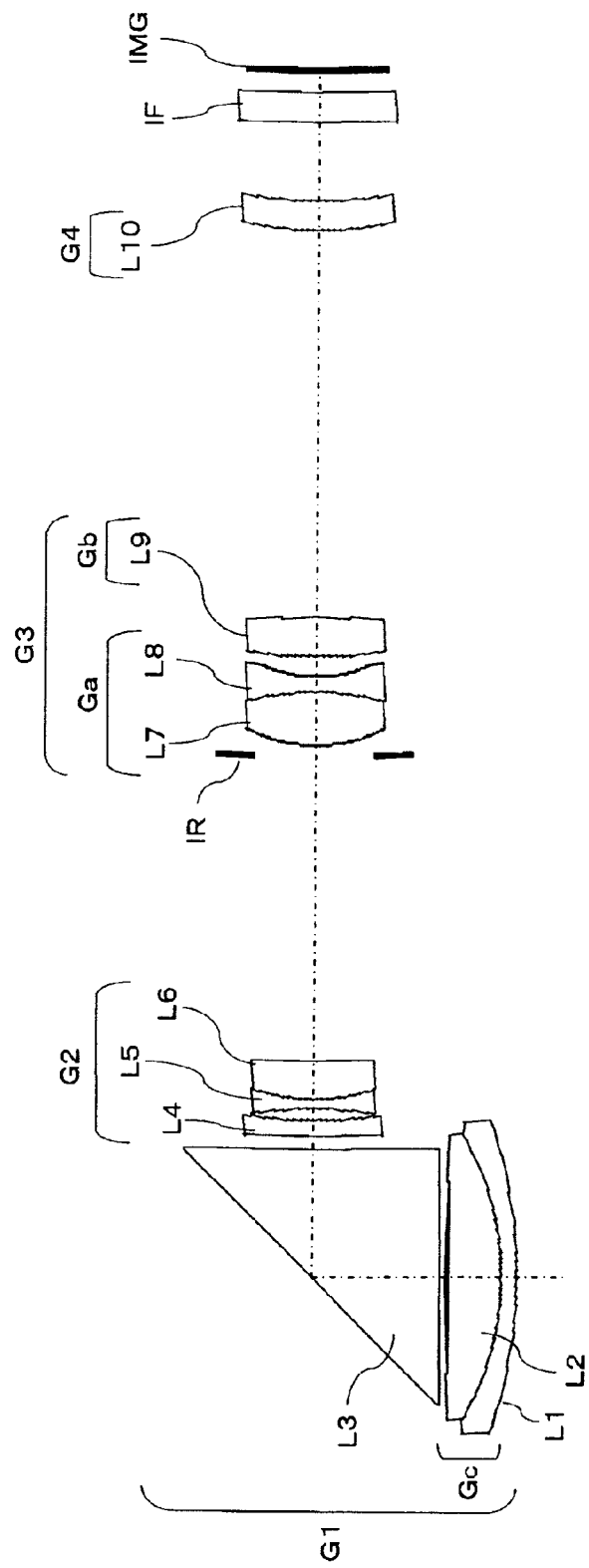
FIG. 12 is a view showing the configuration of a zoom lens according to a second embodiment of the present invention.

FIG. 12 is a view showing the configuration of a zoom lens according to a second embodiment of the present invention. Like the first embodiment, this zoom lens also includes, in sequence from an object, the first lens group G1 having positive refractive power, the second lens group G2 having negative refractive power, the third lens group G3 having positive refractive power, and the fourth lens group G4 having positive refractive power. The iris member IR for limiting the amount of incident light is interposed between the second lens group G2 and the third lens group G3. The optically equivalent member IF is interposed between the fourth lens group G4 and an image forming surface IMG.

The first lens group G1 includes, in sequence from the object, the positive lens group Gc having positive refractive power, and the bending member L3 for bending the optical axis to an angle of about 90°. The positive lens group Gc is a cemented lens into which the negative meniscus lens L1 and the biconvex lens L2 are cemented in this sequence from the object. The bending member L3 is a triangular prism.

The second lens group G2 is formed from a cemented lens into which the biconcave lens L4, the biconcave lens L5, and the positive meniscus lens L6 whose convex surface is oriented toward the object are cemented together, in this sequence from the object. The second lens group G2 has, on the whole, negative refractive power.

The third lens group G3 includes, in sequence from the object, the stationary lens group Ga having positive refractive power and the movable lens group Gb having positive refractive power. The stationary lens group Ga is formed from a cemented lens in which the biconvex lens L7 and the biconcave lens L8 are cemented together, in this sequence from the object. The movable lens group Gb is formed from the single biconvex lens L9. The movable lens group Gb is moved in a direction orthogonal to the optical axis, to thus perform a vibration-control function of correcting a positional displacement of an image attributable to camera shake, or the like.

The fourth lens group G4 is formed from, in sequence from the object, the positive meniscus lens L10 whose convex surface is oriented toward the object, and has on the whole a positive refractive power.

Table 6 shows specific numerical values of the focal length "f," the aperture F-number Fno, and the half angle of view ω of the zoom lens of the second embodiment. Table 7 shows numerical values of respective lenses constituting the zoom lens of the second embodiment.

TABLE 6

|  | F | Fno | ω |
|---|---|---|---|
| Wide-angle end | 22.00 | 4.97 | 9.45 |
| Middle point | 38.30 | 4.99 | 5.38 |
| Telephoto end | 66.70 | 4.97 | 3.06 |

TABLE 7

| Lens No. | Surface No. | Curvature Radius R | Surface Separation Distance D | Refractive Index Nd | Abbe No. vd |
|---|---|---|---|---|---|
| L1 | S1 | 24.826 | D1 0.800 | 1.8467 | 23.8 |
| L2 | S2 | 14.864 | D2 2.800 | 1.6131 | 44.4 |
|  | S3 | −138.900 | D3 0.300 |  |  |
| L3 | S4 | INF | D4 13.000 | 1.8061 | 33.3 |
|  | S5 | INF | D5 VARIABLE |  |  |

TABLE 7-continued

| Lens No. | Surface No. | Curvature Radius R | Surface Separation Distance D | Refractive Index Nd | Abbe No. vd |
|---|---|---|---|---|---|
| L4 | S6 | 359.600 | D6 0.800 | 1.8160 | 46.6 |
|  | S7 | 19.694 | D7 0.600 |  |  |
| L5 | S8 | −20.770 | D8 0.500 | 1.8350 | 43.0 |
| L6 | S9 | 8.912 | D9 1.960 | 1.8467 | 23.8 |
|  | S10 | 194.100 | D10 VARIABLE |  |  |
| IR | — | — | DIR 0.500 | — | — |
| L7 | S11 | 7.380 | D11 2.700 | 1.8210 | 42.7 |
| L8 | S12 | −14.537 | D12 0.750 | 1.6989 | 30.1 |
|  | S13 | 6.700 | D13 1.000 |  |  |
| L9 | S14 | 19.523 | D14 2.000 | 1.4970 | 81.6 |
|  | S15 | −97.250 | D15 VARIABLE |  |  |
| L10 | S16 | 16.656 | D16 2.000 | 1.4875 | 70.4 |
|  | S17 | 22.120 | D17 VARIABLE |  |  |
| IF | S18 | INF | D18 1.500 | 1.5168 | 64.2 |
|  | S19 | INF | D19 — |  |  |

In the second embodiment, in order to enable superior correction of spherical aberration, coma aberration, and the like, the surface S11 of the stationary lens group Ga that is closest to the object is formed into such an aspherical shape that the action of converging a luminous flux becomes weaker with increasing distance from the optical axis to the periphery of the lens. The face S13 of the stationary lens group Ga that is closest to the image surface side is also formed into an aspherical shape. These aspherical shapes are expressed by Equation 6 mentioned above, and specific numerical values of the aspherical coefficients "k," A, B, C, and D are as shown in Table 8.

TABLE 8

| Surface No. | K | A | B | C | D |
|---|---|---|---|---|---|
| S11 | 0.00000E+00 | 3.0993E−06 | −2.4080E−06 | 0.0000E+00 | 0.0000E+00 |
| S13 | 0.00000E+00 | 4.4055E−04 | 1.0979E−05 | 0.0000E+00 | 0.0000E+00 |

Moreover, in the second embodiment, values of surface separation distances D5, D10, D15, and D17 are made variable by scaling operation. Table 9 shows values acquired at the wide-angle end, the intermediate focal length, and the telephoto end of each of surface separation distances D5, D10, D15, and D17.

TABLE 9

|  | Focal Length | | |
|---|---|---|---|
|  | 22.00 | 38.30 | 66.70 |
| D5 | 0.700 | 8.085 | 14.062 |
| D10 | 14.862 | 7.477 | 1.500 |
| D15 | 20.504 | 6.83 | 20.504 |
| D17 | 1.000 | 14.674 | 1.000 |

Table 10 also shows specific numerical values of parameters of the second embodiment represented by Conditional Equations 1 through 5.

TABLE 10

| Eq. 1 | $1.4 < fa/f3 < 3.1$ | 1.6 |
| Eq. 2 | $0.01 < Dab/f3 < 0.10$ | 0.06 |
| Eq. 3 | $|vb1 - vb2| > 20$ | — |
| Eq. 4 | $|va1 - va2| > 5$ | 24.6 |
| Eq. 5 | $d/fw < 0.22$ | 0.16 |

As is evident from Table 10, in the present embodiment, Conditional Equations 1, 2, 4, and 5 are understood to be satisfied. In the second embodiment, since the movable lens group Gb is formed from a single lens, specific numerical values of Conditional Equation 3 acquired when the movable lens group Gb is constituted of a cemented lens are naturally not computed.

Figure 13:
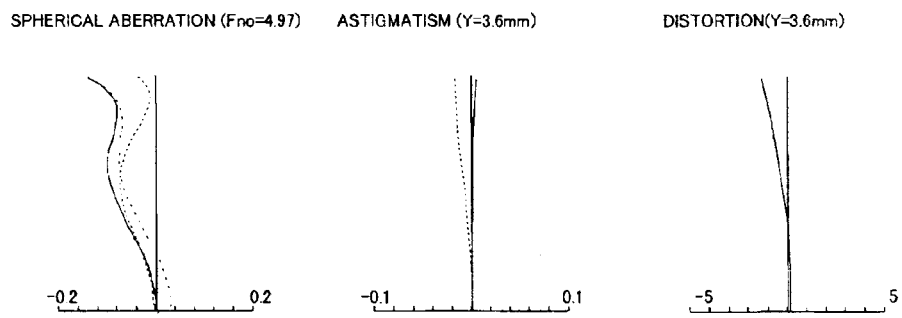
FIG. 13 is a view of various aberrations acquired at a wide-angle end of the zoom lens of the second embodiment.
Figure 14:
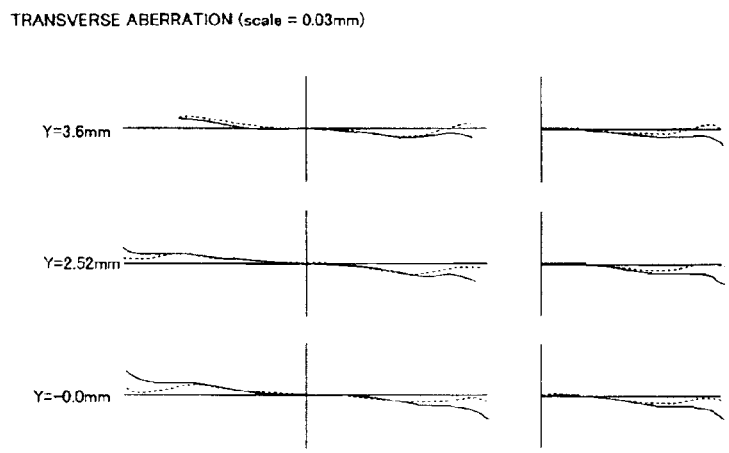
FIG. 14 is a view of transverse aberration acquired at the wide-angle end of the zoom lens of the second embodiment.
Figure 15:
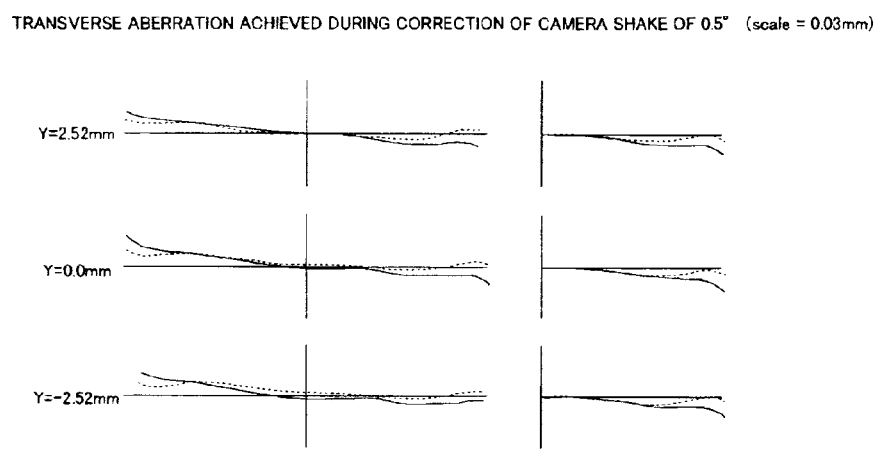
FIG. 15 is a view of transverse aberration acquired during correction of camera shake at the wide-angle end of the zoom lens of the second embodiment.

Next, optical characteristics of the zoom lens of the second embodiment will be described. FIGS. 13 through 15 are various diagrams of aberration achieved at the wide-angle end of the zoom lens of the second embodiment. FIGS. 13 to 15 show essentially the same characteristics as those shown in FIGS. 3 to 5. More specifically, FIG. 13 shows, in sequence from the left, a spherical aberration diagram, an astigmatism diagram, and a distortion aberration diagram. FIG. 14 is a view of transverse aberration, and FIG. 15 is a view of transverse aberration acquired when camera shake of 0.5° is corrected.

Figure 16:
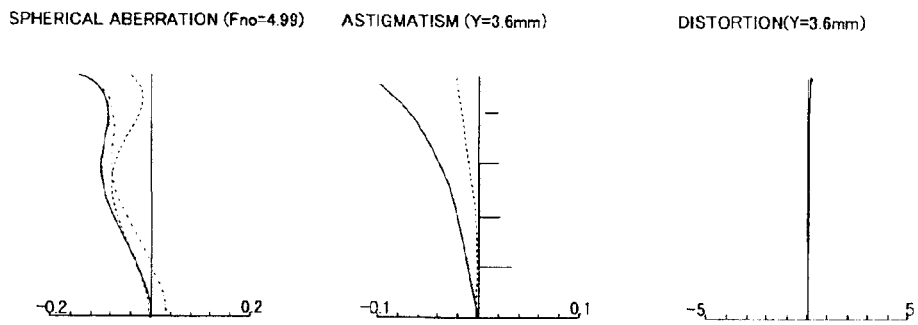
FIG. 16 is a view of various aberrations acquired at an intermediate focal length of the zoom lens of the second embodiment.
Figure 17:
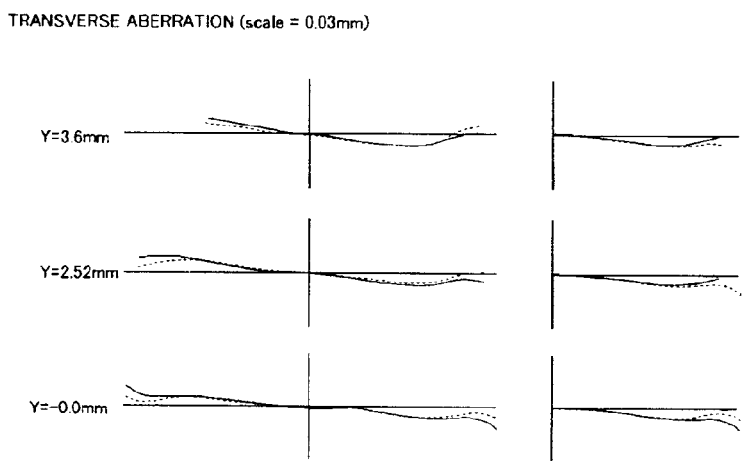
FIG. 17 is a view of transverse aberration acquired at the intermediate focal length of the zoom lens of the second embodiment.
Figure 18:
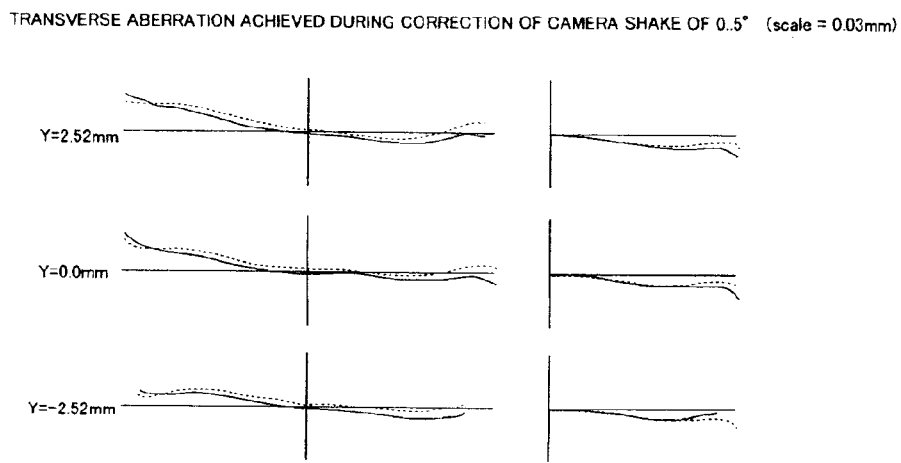
FIG. 18 is a view of transverse aberration acquired during correction of camera shake at the intermediate focal length of the zoom lens of the second embodiment.
Figure 19:
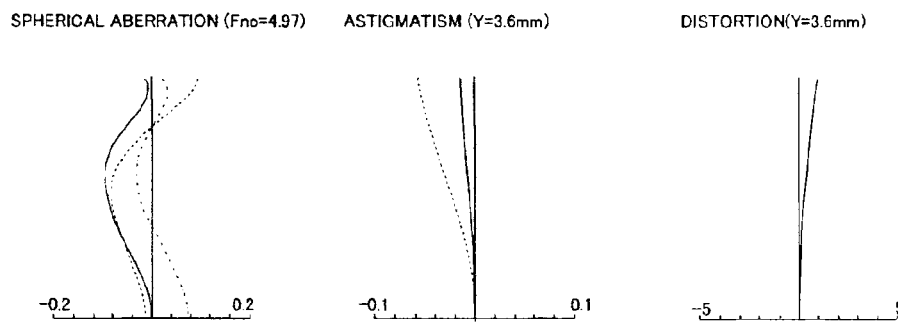
FIG. 19 is a view of various aberrations acquired at a telephoto end of the zoom lens of the second embodiment.
Figure 20:
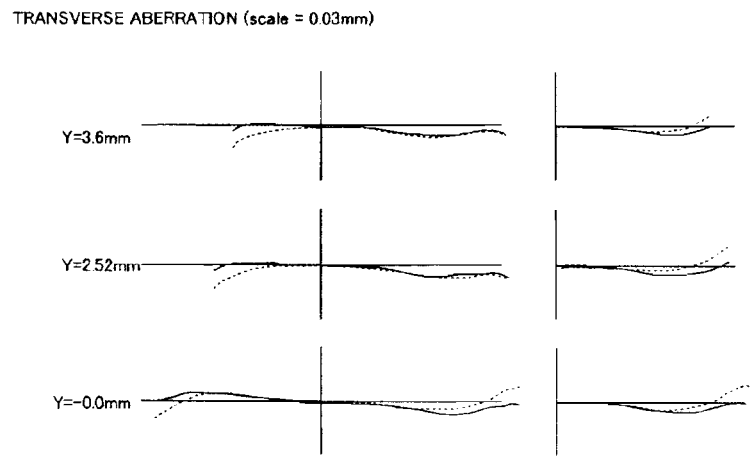
FIG. 20 is a view of transverse aberration acquired at the telephoto end of the zoom lens of the second embodiment.
Figure 21:
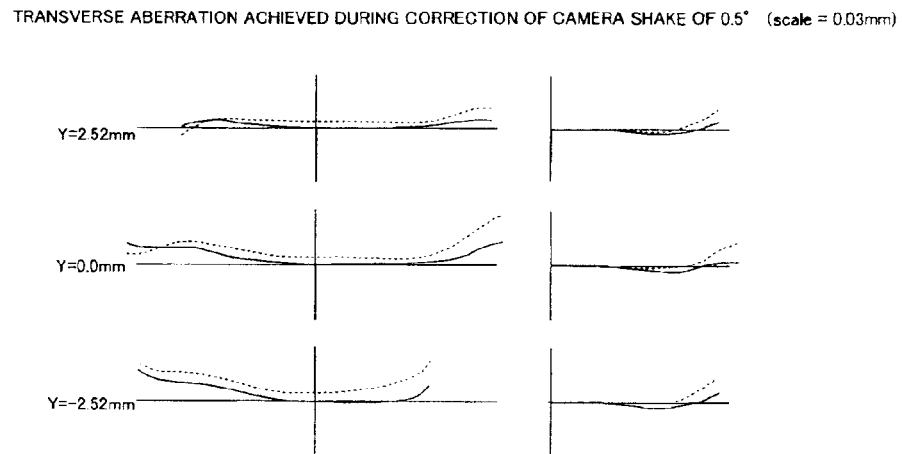
FIG. 21 is a view of transverse aberration acquired during correction of camera shake at the telephoto end of the zoom lens of the second embodiment.

Likewise, FIGS. 16 through 18 are diagrams of aberration achieved at the intermediate focal length of the zoom lens of the second embodiment. FIGS. 16 through 18 show the same characteristics as those shown in FIGS. 13 through 15. FIGS. 19 through 21 are diagrams of various aberrations achieved at the telephoto end of the zoom lens of the second embodiment. FIGS. 19 through 21 show the same characteristics as those shown in FIGS. 13 to 15 and FIGS. 16 to 18.

As is obvious from FIGS. 13 through 21, according to the second embodiment, aberrations are understood to be well corrected at all times, including at the time of vibration-control operation, and have superior optical characteristics.

Third Embodiment

Figure 22:
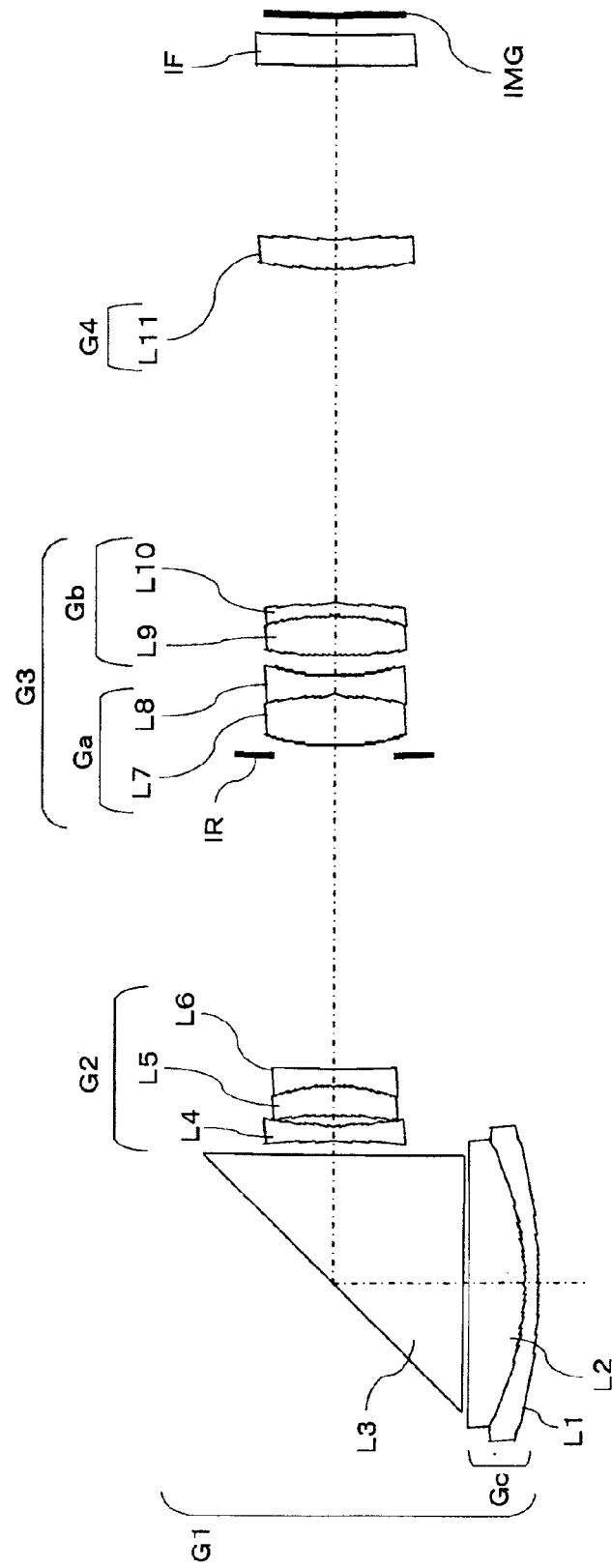
FIG. 22 is a view showing the configuration of a zoom lens according to a third embodiment of the present invention.

FIG. 22 is a view showing the configuration of a zoom lens according to a third embodiment of the present invention. Like the first and second embodiments, this zoom lens also includes, in sequence from the object, the first lens group G1 having positive refractive power, the second lens group G2 having negative refractive power, the third lens group G3 having positive refractive power, and the fourth lens group G4 having positive refractive power. The iris member IR for limiting the amount of incident light is interposed between the second lens group G2 and the third lens group G3. The optically equivalent member IF is interposed between the fourth lens group G4 and an image forming surface IMG.

The first lens group G1 includes, in sequence from the object, the positive lens group Gc having positive refractive power, and the bending member L3 for bending the optical axis to an angle of about 90°. The positive lens group Gc is a cemented lens into which the negative meniscus lens L1 and the biconvex lens L2 are cemented together in this sequence from the object. The bending member L3 is a triangular prism.

The second lens group G2 is formed from a cemented lens into which the biconcave lens L4, the positive meniscus lens L5 whose concave surface is oriented toward the object, and the biconcave lens L6 are cemented together, in this sequence from the object. The second lens group G2 has, on the whole, negative refractive power.

The third lens group G3 includes the stationary lens group Ga having positive refractive power and the movable lens group Gb having positive refractive power. The stationary lens group Ga is formed from a cemented lens in which the biconvex lens L7 and the biconcave lens L8 are cemented together, in this sequence from the object.

The movable lens group Gb is formed from a single cemented lens. The cemented lens is formed by means of cementing, in sequence from the object, the biconvex lens L9 and the negative meniscus lens L10 whose concave surface is oriented toward the object. This movable lens group is moved in a direction orthogonal to the optical axis, to thus perform a vibration-control function of correcting a positional displacement of an image attributable to camera shake, or the like.

The fourth lens group G4 is formed from, in sequence from the object, the positive meniscus lens L11 whose convex surface is oriented toward the object, and has on the whole a positive refractive power.

Table 11 shows specific numerals of the focal length "f," the aperture F-number Fno, and the half angle of view ω of the zoom lens of the third embodiment. Table 12 shows numerical values of respective lenses constituting the zoom lens of the third embodiment.

TABLE 11

|  | F | Fno | ω |
|---|---|---|---|
| Wide-angle end | 22.00 | 4.99 | 9.25 |
| Middle point | 38.30 | 5.02 | 5.42 |
| Telephoto end | 66.70 | 4.99 | 3.08 |

TABLE 12

| Lens No. | Surface No. | Curvature Radius R | Surface Separation Distance D | Refractive Index Nd | Abbe No. νd |
|---|---|---|---|---|---|
| L1 | S1 | 27.973 | D1 0.750 | 1.8467 | 23.8 |
| L2 | S2 | 16.427 | D2 2.800 | 1.7200 | 46.0 |
|  | S3 | 1012.000 | D3 0.300 |  |  |
| L3 | S4 | INF | D4 13.000 | 1.5710 | 50.8 |
|  | S5 | INF | D5 VARIABLE |  |  |
| L4 | S6 | −44.920 | D6 0.800 | 1.4970 | 81.6 |
|  | S7 | 18.000 | D7 0.478 |  |  |
| L5 | S8 | −22.896 | D8 1.500 | 1.8467 | 23.8 |
| L6 | S9 | −8.836 | D9 0.900 | 1.8160 | 46.6 |
|  | S10 | 94.956 | D10 VARIABLE |  |  |
| IR | — | — | DIR 0.500 | — | — |
| L7 | S11 | 10.828 | D11 2.500 | 1.8208 | 42.7 |
| L8 | S12 | −18.900 | D12 1.000 | 1.6889 | 31.2 |
|  | S13 | 11.096 | D13 1.000 |  |  |

TABLE 12-continued

| Lens No. | Surface No. | Curvature Radius R | Surface Separation Distance D | Refractive Index Nd | Abbe No. νd |
|---|---|---|---|---|---|
| L9 | S14 | 17.595 | D14 2.000 | 1.4875 | 70.4 |
| L10 | S15 | −13.442 | D15 0.600 | 1.7495 | 35.0 |
|  | S16 | −30.172 | D16 VARIABLE |  |  |
| L11 | S17 | 23.212 | D17 1.500 | 1.4875 | 70.4 |
|  | S18 | 38.800 | D18 VARIABLE |  |  |
| IF | S19 | INF | D19 1.500 | 1.5168 | 64.2 |
|  | S20 | INF | D20 — |  |  |

In the third embodiment, in order to enable superior correction of spherical aberration, coma aberration, and the like, the surface S11 of the stationary lens group Ga that is closest to the object is formed into such an aspherical shape that the action of converging a luminous flux becomes weaker with increasing distance from the optical axis to the periphery of the lens. The face S13 of the stationary lens group Ga that is closest to the image surface side is also formed into an aspherical shape. These aspherical shapes are expressed by Equation 6 mentioned above, and specific numerical values of the aspherical coefficients "k," A, B, C, and D are as shown in Table 13.

TABLE 13

| Surface No. | k | A | B | C | D |
|---|---|---|---|---|---|
| S11 | 0.00000E+00 | 8.7008E−05 | 2.9261E−07 | 0.0000E+00 | 0.0000E+00 |
| S13 | 0.00000E+00 | 3.0402E−04 | 3.5986E−06 | 0.0000E+00 | 0.0000E+00 |

Moreover, in the third embodiment, values of surface separation distances D5, D10, D16, and D18 are made variable by scaling operation. Table 14 shows values acquired at the wide-angle end, the intermediate focal length, and the telephoto end of each of surface separation distances D5, D10, D16, and D18.

TABLE 14

|  | Focal Length | | |
|---|---|---|---|
|  | 22.00 | 38.30 | 66.70 |
| D5 | 0.700 | 8.225 | 14.824 |
| D10 | 15.624 | 8.099 | 1.500 |
| D16 | 16.852 | 6.840 | 16.852 |
| D18 | 8.697 | 18.709 | 8.697 |

Table 15 also shows specific numerical values of parameters of the third embodiment represented by Conditional Equations 1 through 5.

TABLE 15

| Eq. 1 | $1.4 < fa/f3 < 3.1$ | 1.9 |
|---|---|---|
| Eq. 2 | $0.01 < Dab/f3 < 0.10$ | 0.06 |
| Eq. 3 | $|vb1 - vb2| > 20$ | 35.4 |
| Eq. 4 | $|va1 - va2| > 5$ | 11.5 |
| Eq. 5 | $d/fw < 0.22$ | 0.16 |

As is evident from Table 15, in the present embodiment, Conditional Equations 1, 2, 4, and 5 are understood to be satisfied.

Figure 23:
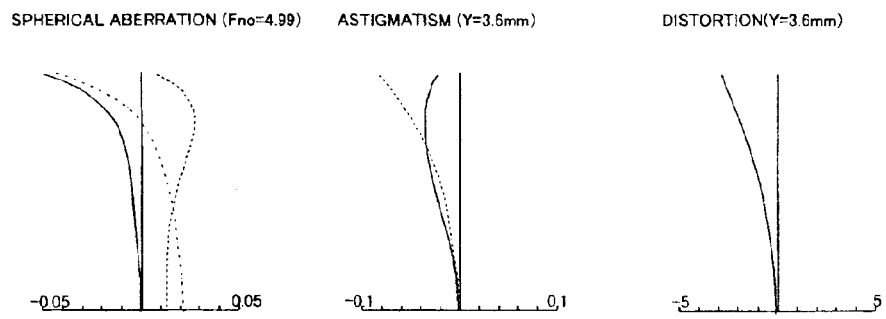
FIG. 23 is a view of various aberrations acquired at a wide-angle end of the zoom lens of the third embodiment.
Figure 24:
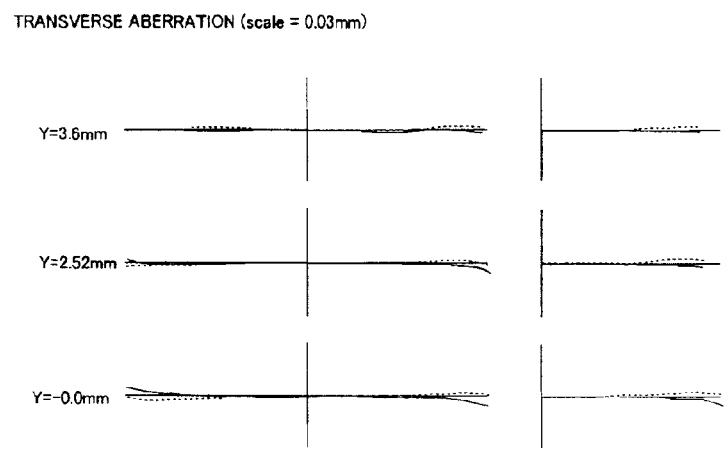
FIG. 24 is a view of transverse aberration acquired at the wide-angle end of the zoom lens of the third embodiment.
Figure 25:
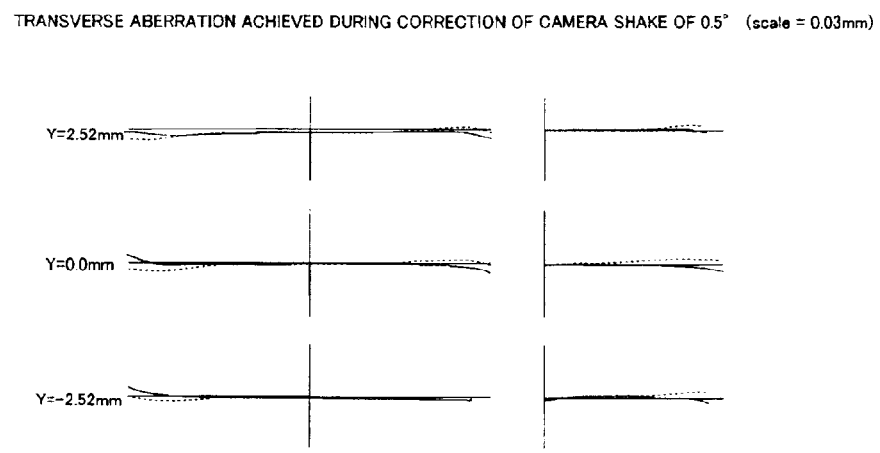
FIG. 25 is a view of transverse aberration acquired during correction of camera shake at the wide-angle end of the zoom lens of the third embodiment.

Next, optical characteristics of the zoom lens of the third embodiment will be described. FIGS. 23 through 25 are various diagrams of aberration achieved at the wide-angle end of the zoom lens of the third embodiment. FIGS. 23 to 25 show essentially the same characteristics as those shown in FIGS. 3 to 5. More specifically, FIG. 23 shows, in sequence from the left, a spherical aberration diagram, an astigmatism diagram, and a distortion aberration diagram. FIG. 24 is a view of transverse aberration, and FIG. 25 is a view of transverse aberration acquired when camera shake of 0.5° is corrected.

Figure 26:
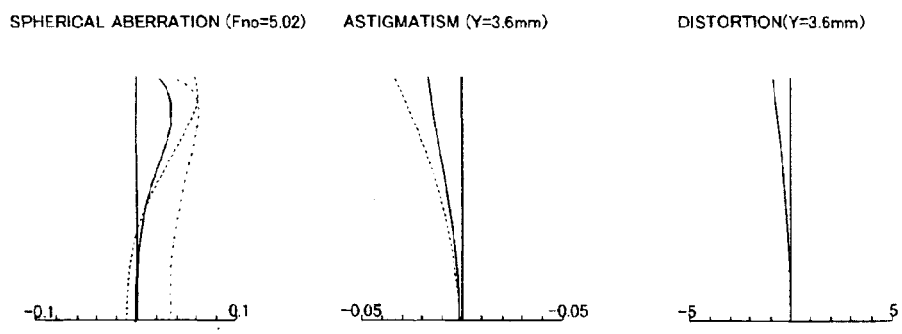
FIG. 26 is a view of various aberrations acquired at an intermediate focal length of the zoom lens of the third embodiment.
Figure 27:
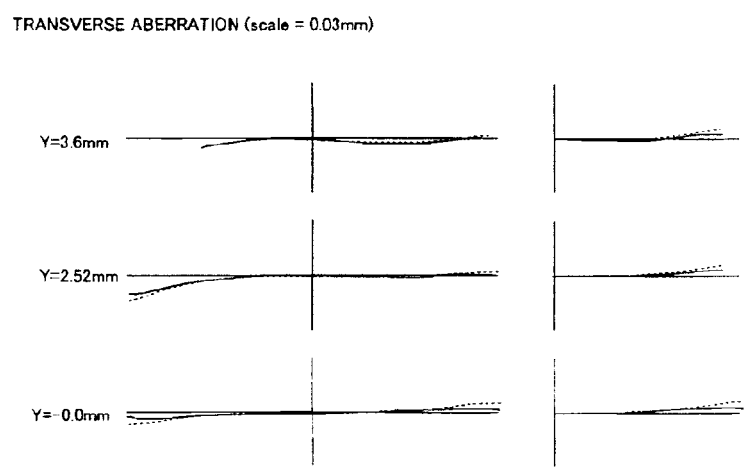
FIG. 27 is a view of transverse aberration acquired at the intermediate focal length of the zoom lens of the third embodiment.
Figure 28:
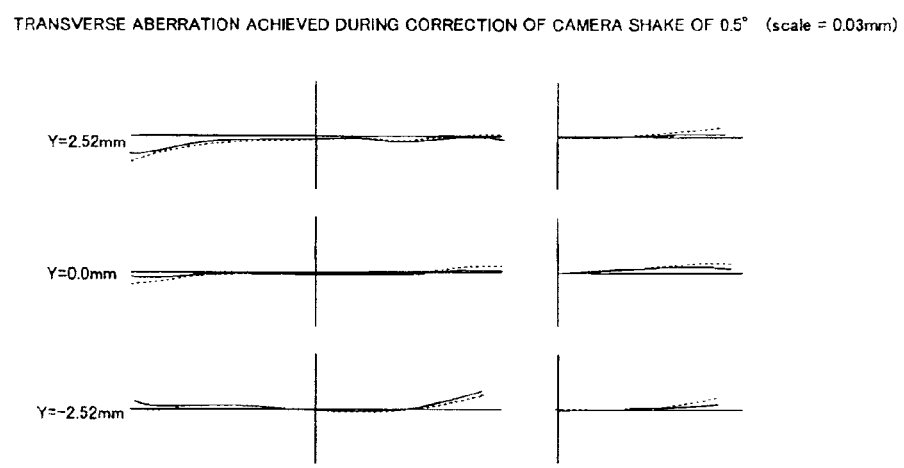
FIG. 28 is a view of transverse aberration acquired during correction of camera shake at the intermediate focal length of the zoom lens of the third embodiment.
Figure 29:
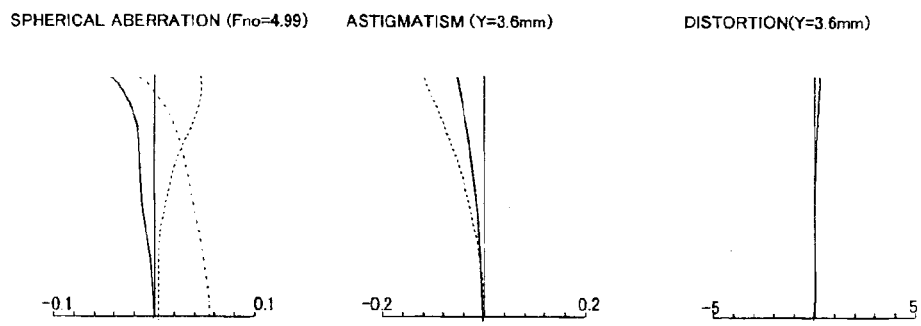
FIG. 29 is a view of various aberrations acquired at a telephoto end of the zoom lens of the third embodiment.
Figure 30:
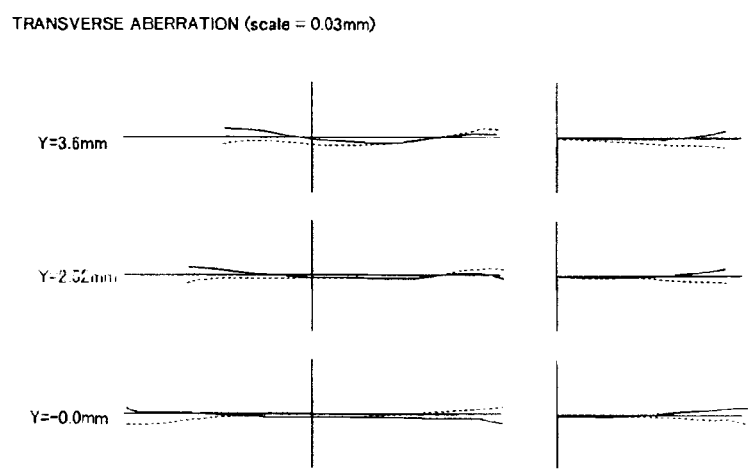
FIG. 30 is a view of transverse aberration acquired at the telephoto end of the zoom lens of the third embodiment.
Figure 31:
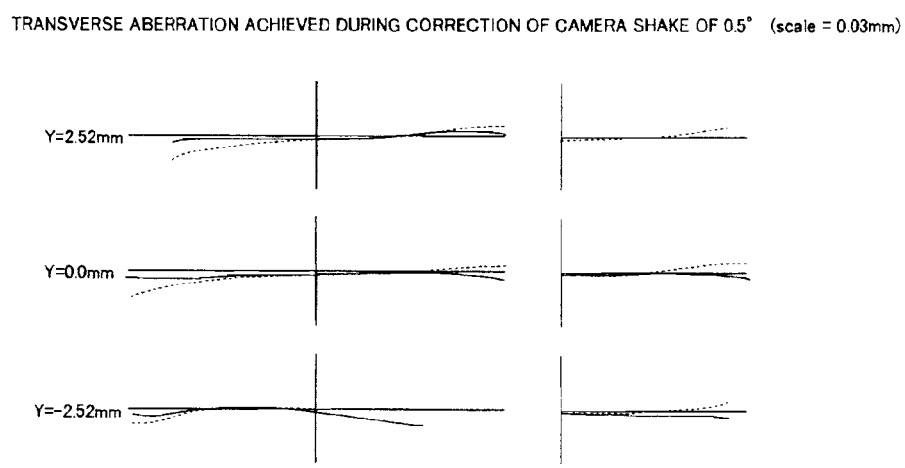
FIG. 31 is a view of transverse aberration acquired during correction of camera shake at the telephoto end of the zoom lens of the third embodiment.

Likewise, FIGS. 26 through 28 are diagrams of aberration achieved at the intermediate focal length of the zoom lens of the third embodiment. FIGS. 26 through 28 show the same characteristics as those shown in FIGS. 23 through 25. FIGS. 29 through 31 are diagrams of various aberrations achieved at the telephoto end of the zoom lens of the third embodiment. FIGS. 29 through 31 show the same characteristics as those shown in FIGS. 23 to 25 and FIGS. 26 to 28.

As is obvious from FIGS. 23 through 31, according to the third embodiment, aberrations are understood to be well corrected at any times, including vibration-control operation, and have superior optical characteristics.

Fourth Embodiment

Figure 32:
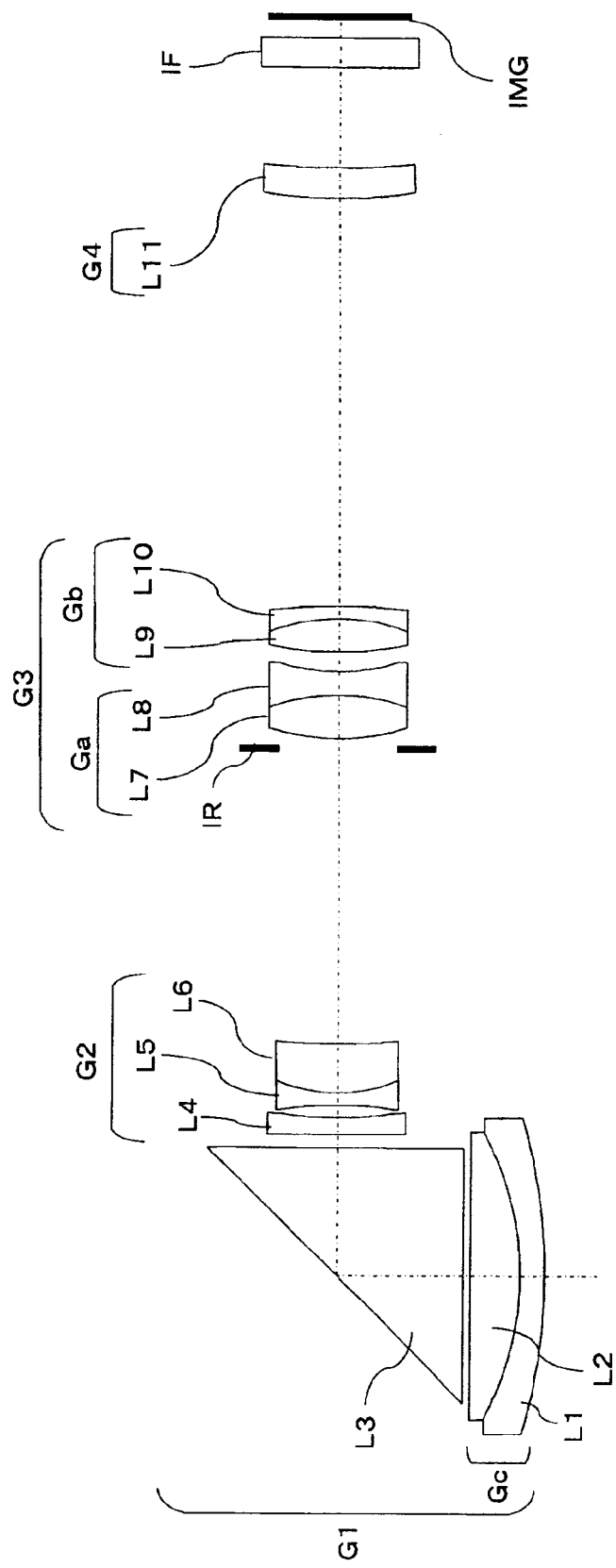
FIG. 32 is a view showing the configuration of a zoom lens according to a fourth embodiment of the present invention.

FIG. 32 is a view showing the configuration of a zoom lens according to a fourth embodiment of the present invention. Like the first through third embodiments, this zoom lens also includes, in sequence from the object, the first lens group G1 having positive refractive power, the second lens group G2 having negative refractive power, the third lens group G3 having positive refractive power, and the fourth lens group G4 having positive refractive power. The iris member IR for limiting the amount of incident light is interposed between the second lens group G2 and the third lens group G3. The optically equivalent member IF is interposed between the fourth lens group G4 and an image forming surface IMG.

The first lens group G1 includes, in sequence from the object, the positive lens group Gc having positive refractive power, and the bending member L3 for bending the optical axis to an angle of about 90°. The positive lens group Gc is a cemented lens into which the negative meniscus lens L1 and the biconvex lens L2 are cemented together in this sequence from the object. The bending member L3 is a triangular prism.

The second lens group G2 is formed from a cemented lens into which the biconcave lens L4, the biconcave lens L5, and the positive meniscus lens L6 with its convex surface being oriented toward the object are cemented together, in this sequence from the object. The second lens group G2 has, on the whole, negative refractive power.

The third lens group G3 includes the stationary lens group Ga having positive refractive power and the movable lens group Gb having positive refractive power. The stationary lens group Ga is formed from a cemented lens in which the biconvex lens L7 and the biconcave lens L8 are cemented together, in this sequence from the object.

The movable lens group Gb is formed from a single cemented lens. The cemented lens is formed by means of cementing together, in sequence from the object, the biconvex lens L9 and the negative meniscus lens L10 whose concave surface is oriented toward the object. This movable lens group Gb is moved in a direction orthogonal to the optical axis, to thus perform a vibration-control function of correcting a positional displacement of an image attributable to camera shake, or the like.

The fourth lens group G4 is formed from, in sequence from the object, the positive meniscus lens L11 whose convex surface is oriented toward the object, and has on the whole as positive refractive power.

Table 16 shows specific numerals of the focal length "f," the aperture F-number Fno, and the half angle of view ω of the zoom lens of the fourth embodiment. Table 17 shows numerals of respective lenses constituting the zoom lens of the fourth embodiment.

TABLE 16

|  | F | Fno | ω |
|---|---|---|---|
| Wide-angle end | 22.00 | 5 | 9.58 |
| Middle point | 38.30 | 4.98 | 5.42 |
| Telephoto end | 66.70 | 4.99 | 3.08 |

TABLE 17

| Lens No. | Surface No. | Curvature Radius R | Surface Separation Distance D | Refractive Index Nd | Abbe No. vd |
|---|---|---|---|---|---|
| L1 | S1 | 27.510 | D1 1.290 | 1.8052 | 25.5 |
| L2 | S2 | 15.425 | D2 2.500 | 1.7170 | 48.0 |
|  | S3 | 793.950 | D3 0.400 |  |  |
| L3 | S4 | INF | D4 13.000 | 1.7283 | 28.3 |
|  | S5 | INF | D5 VARIABLE |  |  |
| L4 | S6 | −121.010 | D6 0.800 | 1.4875 | 70.4 |
|  | S7 | 21.906 | D7 0.600 |  |  |
| L5 | S8 | −23.072 | D8 0.650 | 1.8160 | 46.6 |
| L6 | S9 | 8.531 | D9 2.400 | 1.8467 | 23.8 |
|  | S10 | 32.859 | D10 VARIABLE |  |  |
| IR | — | — | DIR 0.500 | — | — |
| L7 | S11 | 11.789 | D11 2.200 | 1.8514 | 40.1 |
| L8 | S12 | −10.332 | D12 1.200 | 1.7205 | 34.7 |
|  | S13 | 9.594 | D13 1.000 |  |  |
| L9 | S14 | 16.949 | D14 1.700 | 1.6400 | 60.2 |
| L10 | S15 | −9.760 | D15 0.650 | 1.8061 | 33.3 |
|  | S16 | −30.040 | D16 VARIABLE |  |  |
| L11 | S17 | 27.380 | D17 1.500 | 1.4875 | 70.4 |
|  | S18 | 44.876 | D18 VARIABLE |  |  |
| IF | S19 | INF | D19 1.500 | 1.5168 | 64.2 |
|  | S20 | INF | D20 — |  |  |

In the fourth embodiment, in order to enable superior correction of spherical aberration, coma aberration, and the like, the surface S11 of the stationary lens group that is closest to the object is formed into such an aspherical shape that the action of converging a luminous flux becomes weaker with increasing distance from the optical axis to the periphery of the lens. These aspherical shapes are expressed by Equation 6 mentioned above, and specific numerals of the aspherical coefficients "k," A, B, C, and D are as shown in Table 18.

TABLE 18

| Surface No. | k | A | B | C | D |
|---|---|---|---|---|---|
| S11 | 0.00000E+00 | −6.5935E−05 | −4.8188E−07 | 0.0000E+00 | 0.0000E+00 |

Moreover, in the fourth embodiment, values of surface separation distances D5, D10, D16, and D18 are made variable by scaling operation. Table 19 shows values acquired at the wide-angle end, the intermediate focal length, and the telephoto end of each of surface separation distances D5, D10, D16, and D18.

TABLE 19

| | Focal Length | | |
|---|---|---|---|
| | 22.00 | 38.30 | 66.70 |
| D5 | 0.700 | 7.933 | 14.051 |
| D10 | 14.851 | 7.618 | 1.500 |
| D16 | 20.500 | 7.000 | 20.500 |
| D18 | 5.000 | 18.500 | 5.000 |

Table 20 also shows specific numerical values of parameters of the fourth embodiment represented by Conditional Equations 1 through 5.

TABLE 20

| Eq. 1 | 1.4 < fa/f3 < 3.1 | 3.0 |
|---|---|---|
| Eq. 2 | 0.01 < Dab/f3 < 0.10 | 0.06 |
| Eq. 3 | \|vb1 − vb2\| > 20 | 37.1 |
| Eq. 4 | \|va1 − va2\| > 5 | 5.4 |
| Eq. 5 | d/fw < 0.22 | 0.164 |

As is evident from Table 20, in the present embodiment, Conditional Equations 1, 2, 4, and 5 are understood to be satisfied.

Figure 33:
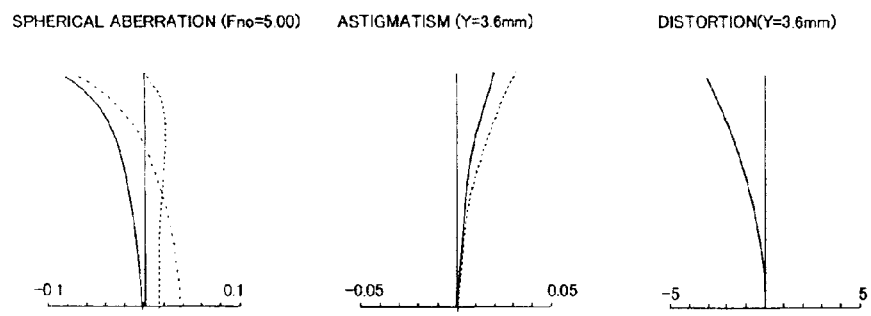
FIG. 33 is a view of various aberrations acquired at a wide-angle end of the zoom lens of the fourth embodiment.
Figure 34:
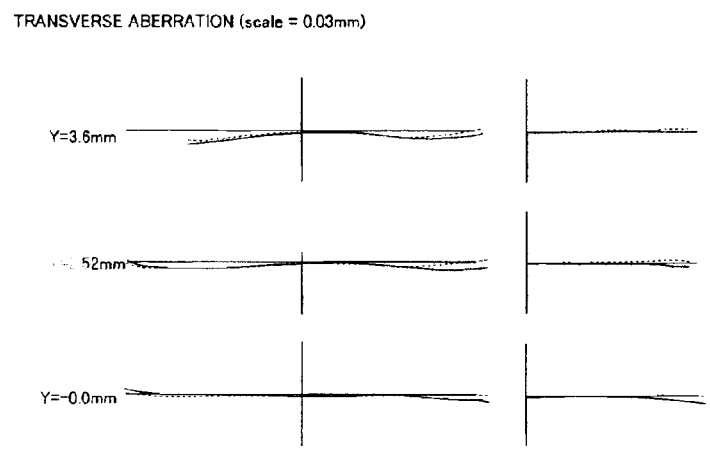
FIG. 34 is a view of transverse aberration acquired at the wide-angle end of the zoom lens of the fourth embodiment.
Figure 35:
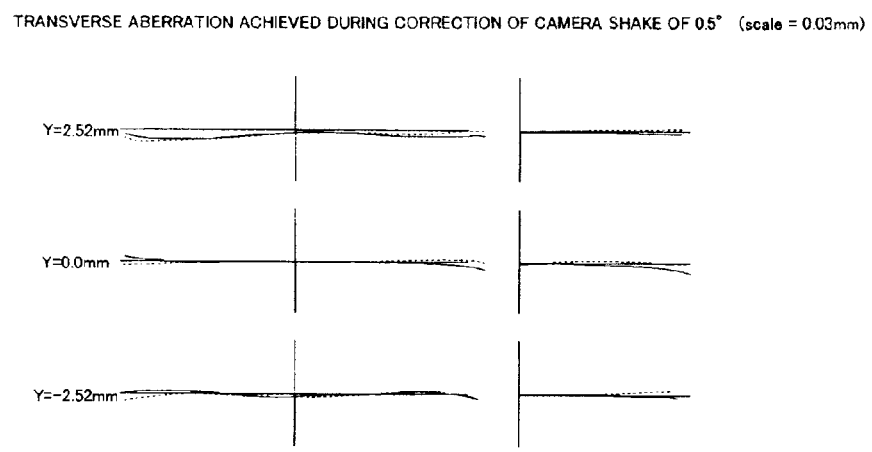
FIG. 35 is a view of transverse aberration acquired during correction of camera shake at the wide-angle end of the zoom lens of the fourth embodiment.

Next, optical characteristics of the zoom lens of the fourth embodiment will be described. FIGS. 33 through 35 are various diagrams of aberration achieved at the wide-angle end of the zoom lens of the fourth embodiment. FIGS. 33 to 35 show essentially the same characteristics as those shown in FIGS. 3 to 5. More specifically, FIG. 33 shows, in sequence from the left, a spherical aberration diagram, an astigmatism diagram, and a distortion aberration diagram. FIG. 34 is a view of transverse aberration, and FIG. 35 is a view of transverse aberration acquired when camera shake of 0.5° is corrected.

Figure 36:
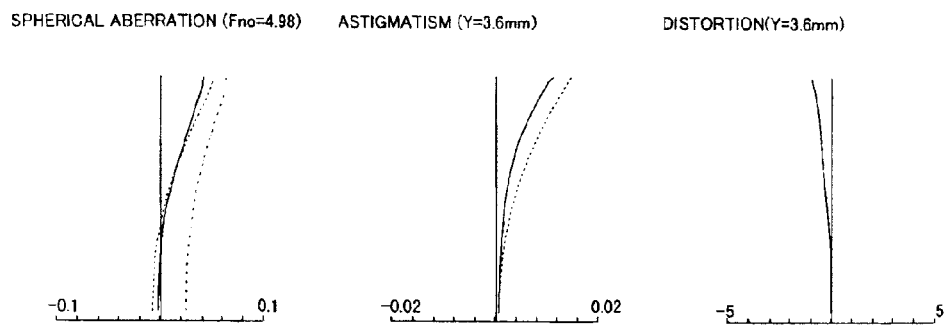
FIG. 36 is a view of various aberrations acquired at an intermediate focal length of the zoom lens of the fourth embodiment.
Figure 37:
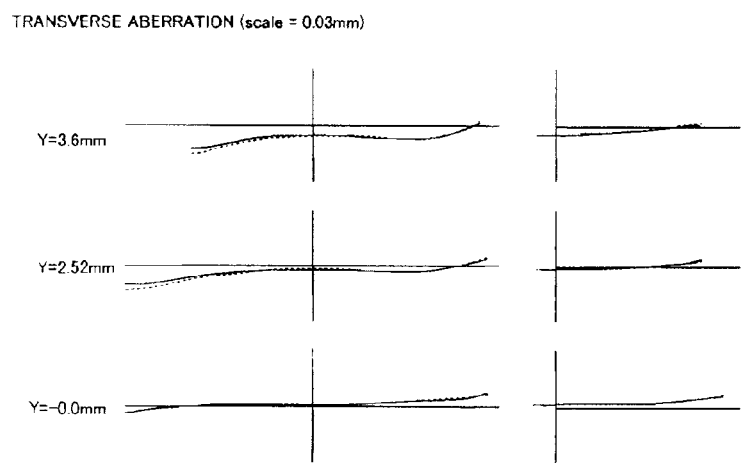
FIG. 37 is a view of transverse aberration acquired at the intermediate focal length of the zoom lens of the fourth embodiment.
Figure 38:
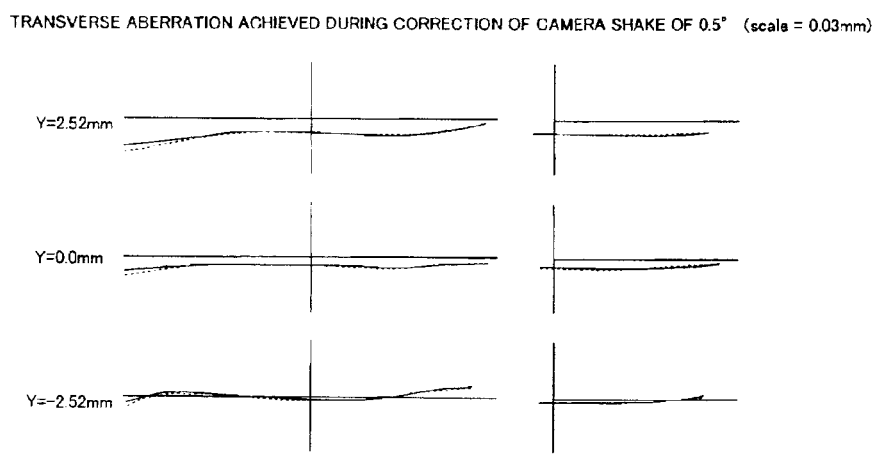
FIG. 38 is a view of transverse aberration acquired during correction of camera shake at the intermediate focal length of the zoom lens of the fourth embodiment.
Figure 39:
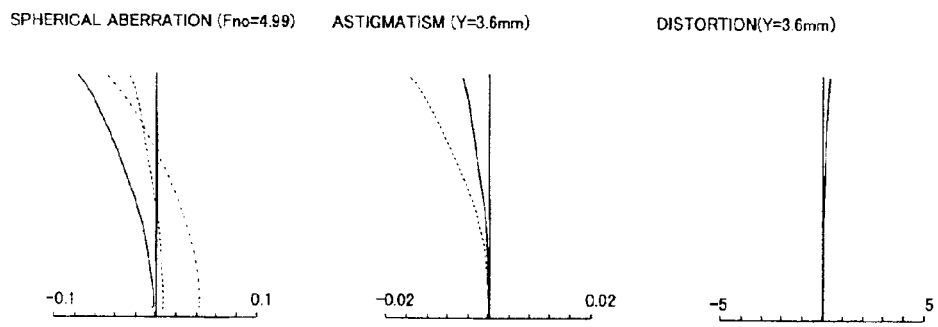
FIG. 39 is a view of various aberrations acquired at a telephoto end of the zoom lens of the fourth embodiment.
Figure 40:
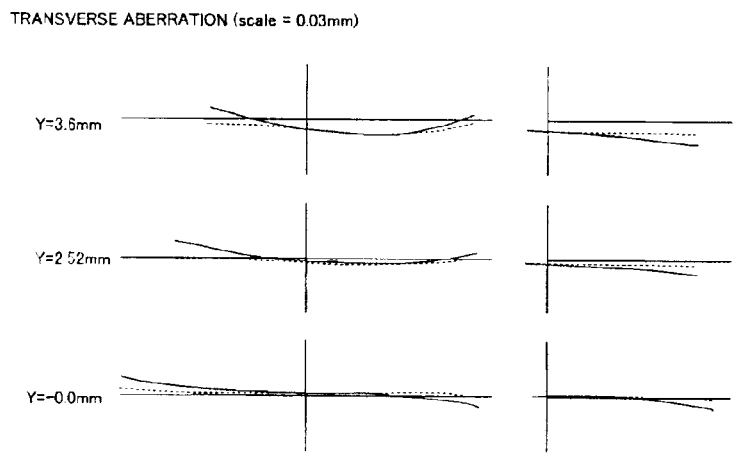
FIG. 40 is a view of transverse aberration acquired at the telephoto end of the zoom lens of the fourth embodiment.
Figure 41:
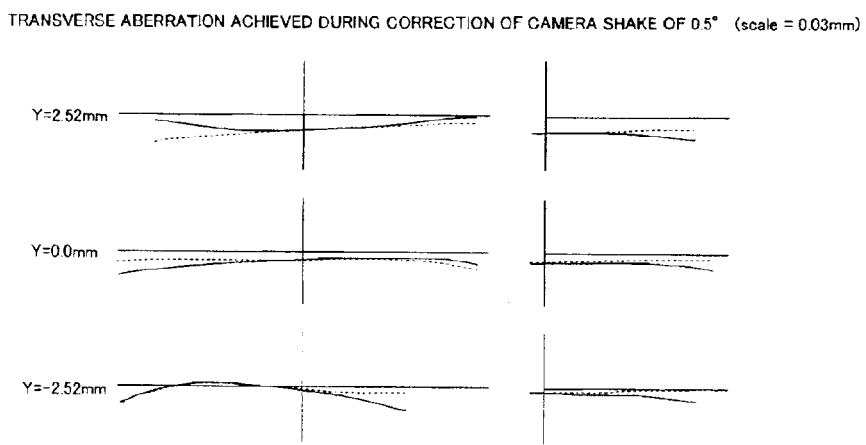
FIG. 41 is a view of transverse aberration acquired during correction of camera shake at the telephoto end of the zoom lens of the fourth embodiment.

Likewise, FIGS. 36 through 38 are diagrams of aberration achieved at the intermediate focal length of the zoom lens of the fourth embodiment. FIGS. 36 through 38 show the same characteristics as those shown in FIGS. 33 through 35. FIGS. 39 through 41 are diagrams of various aberrations achieved at the telephoto end of the zoom lens of the fourth embodiment. FIGS. 39 through 41 show the same characteristics as those shown in FIGS. 33 to 35 and FIGS. 36 to 38.

As is obvious from FIGS. 33 through 41, according to the fourth embodiment, aberrations are understood to be well corrected at any times, including vibration-control operation, and have a superior optical characteristics.

PARTS LIST 10 digital camera
12 zoom lens
14 image capturing element
16 signal-processing section
18 image-processing section
20 LCD
22 memory card
24 vibration sensor
26 control section
28 lens drive control section
Ga stationary lens group
Gb movable lens group
Gc positive lens group
G1 first lens group
G2 second lens group
G3 third lens group
G4 fourth lens group
IF optically equivalent member
IMG image-forming surface
IR iris member
L1 negative meniscus lens
L2 biconvex lens
L3 bending member
L4 biconcave lens
L5 biconcave lens
L5 positive meniscus lens
L6 biconcave lens
L6 positive meniscus lens
L7 biconvex lens
L8 biconcave lens
L8 biconvex lens
L8 biconcave lens
L9 biconvex lens
L9 biconcave lens
L10 negative meniscus lens
L10 positive meniscus lens
L10 biconvex lens
L11 positive meniscus lens
M2 lens path
M3 arrow
M4 lens path
P bending member
Sa surface
Sb surface

What is claimed is:

1. A zoom lens comprising: in sequence from an object, a first lens group having positive refractive power, a second lens group having negative refractive power, a third lens group having positive refractive power, and a fourth lens group having positive refractive power, wherein
the first lens group includes, in sequence from the object, a lens group having positive refractive power and a bending optical system for bending an optical axis to essentially an angle of 90°;
the third lens group has a stationary lens group having positive refractive power and a movable lens group having positive refractive power;
the second lens group and the fourth lens group are moved along the optical axis during zooming operation; and
the movable lens group of the third lens group is moved in a direction orthogonal to the optical axis during vibration-control operation.

2. The zoom lens according to claim 1, wherein, provided that the focal length of the overall third lens group is taken as f3; that the focal length of the stationary lens group is taken as fa; and that an air spacing interval between a surface of the stationary lens group closest to the movable lens group and a surface of the movable lens group closest to the stationary lens group is taken as Dab, 1.4<fa/f3<3.1 and 0.01<Dab/f3<0.10 are satisfied.

3. The zoom lens according to claim 1, wherein the movable lens group is formed from a single positive lens.

4. The zoom lens according to claim 1, wherein the movable lens group is formed from only a cemented lens into which a positive lens having positive refractive power and a negative lens having negative refractive power are cemented together, in sequence from the object.

5. The zoom lens according to claim 4, wherein, provided that an Abbe number of a positive lens forming the cemented lens of the movable lens group is taken as vb1 and that an Abbe number of a negative lens forming the same is taken as vb2, |vb1−vb2|>20 is acquired.

6. The zoom lens according to claim 1, wherein the stationary lens group includes a cemented lens into which a positive lens having positive refractive power and a negative lens having negative refractive power are cemented together, in sequence from the object.

7. The zoom lens according to claims 6, wherein the stationary lens group is formed from only a cemented lens into which a positive lens having positive refractive power and a negative lens having negative refractive power are cemented together, in sequence from the object.

8. The zoom lens according to claim 6, wherein the stationary lens group includes a cemented lens into which a positive lens having positive refractive power, a positive lens having positive refractive power, and a negative lens having negative power are cemented together, in sequence from the object.

9. The zoom lens according to claim 6, wherein, provided that an Abbe number of a positive lens forming the cemented lens of the stationary lens group is taken as va1 and that an Abbe number of a negative lens forming the same is taken as va2, |va1−va2|>5 is satisfied.

10. The zoom lens according to claim 1, wherein the stationary lens group has a lens surface of aspherical shape whose action of converging a luminous flux becomes weaker with increasing distance from the optical axis to a periphery of the lens surface.

11. The zoom lens according to claim 1, wherein, provided that the maximum height of an image on an image surface is taken as "d" and that a focal length of an entire lens system achieved at a wide-angle end thereof is taken as fw, d/fw<0.22 is satisfied.

12. The zoom lens according to claim 1, wherein the third lens group includes the stationary lens group and the movable lens group arranged in this sequence from the object.

13. The zoom lens according to claim 1, wherein the third lens group includes the movable lens group and the stationary lens group arranged in this sequence from the object.

14. An image capturing apparatus having the zoom lens defined in any one of claim 1.

* * * * *